US009401766B2

(12) United States Patent
Yuan et al.

(10) Patent No.: US 9,401,766 B2
(45) Date of Patent: Jul. 26, 2016

(54) QUANTUM COMMUNICATION NETWORK

(75) Inventors: Zhiliang Yuan, Cambridge (GB); James Dynes, Cambridge (GB); Andrew James Shields, Cambridge (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 57 days.

(21) Appl. No.: 13/524,698

(22) Filed: Jun. 15, 2012

(65) Prior Publication Data

US 2012/0328290 A1 Dec. 27, 2012

(30) Foreign Application Priority Data

Jun. 17, 2011 (GB) .................................. 1110364.5

(51) Int. Cl.
*H04B 10/70* (2013.01)
*H04L 9/08* (2006.01)
*H04J 14/02* (2006.01)

(52) U.S. Cl.
CPC .............. *H04B 10/70* (2013.01); *H04L 9/0855* (2013.01); *H04J 14/0282* (2013.01)

(58) Field of Classification Search
CPC ... H04L 9/0852; H04L 9/0883; H04L 47/527; H04L 7/0008; H04B 10/70
USPC ............... 398/47, 52, 153, 140, 168, 98, 154; 380/256, 278
See application file for complete search history.

(56) References Cited

U.S. PATENT DOCUMENTS

| 5,063,595 | A | * | 11/1991 | Ballance | ........................ | 370/522 |
| 5,454,040 | A | * | 9/1995 | Russell | ........................ | 380/276 |
| 5,768,378 | A | | 6/1998 | Townsend et al. | | |
| 5,850,441 | A | | 12/1998 | Townsend et al. | | |
| 7,457,416 | B1 | * | 11/2008 | Elliott | ........................... | 380/256 |
| 7,627,126 | B1 | | 12/2009 | Pikalo et al. | | |
| 2006/0239460 | A1 | * | 10/2006 | Young | ........................... | 380/256 |
| 2007/0133798 | A1 | * | 6/2007 | Elliott | ........................... | 380/255 |
| 2008/0013738 | A1 | * | 1/2008 | Tajima et al. | ................. | 380/278 |
| 2008/0130888 | A1 | * | 6/2008 | Trifonov et al. | .............. | 380/256 |

(Continued)

FOREIGN PATENT DOCUMENTS

EP 1 848 142 A2 10/2007
JP 9-219680 8/1997

(Continued)

OTHER PUBLICATIONS

Combined Search and Examination Report issued Oct. 13, 2011 in United Kingdom Application No. GB1110364.5.

(Continued)

*Primary Examiner* — David Payne
*Assistant Examiner* — Casey Kretzer
(74) *Attorney, Agent, or Firm* — Oblon, McClelland, Maier & Neustadt, L.L.P

(57) ABSTRACT

A quantum communication system comprising a receiver and a plurality of transmitters, said receiver comprising a detector sub-system, each of said transmitters being configured to emit pulses of radiation, said detector subsystem comprising at least one detector, said detector being configured to detect said light pulses, the system comprising a timing control module, said timing control module being configured to control the number of light pulses received by the detector sub-system, such that just one light pulse from one transmitter reaches the detector sub-system at any one time, the timing control module also allowing the transmitter which sent said pulse to be identified.

22 Claims, 13 Drawing Sheets

(56) References Cited

U.S. PATENT DOCUMENTS

| | | | |
|---|---|---|---|
| 2010/0239263 A1* | 9/2010 | Tokura et al. | 398/94 |
| 2010/0329459 A1 | 12/2010 | Wiseman et al. | |
| 2013/0230065 A1* | 9/2013 | Honea et al. | 372/20 |

FOREIGN PATENT DOCUMENTS

| | | |
|---|---|---|
| JP | 2003-18144 | 1/2003 |
| JP | 2010-166507 | 7/2010 |
| JP | 2011-510583 | 3/2011 |
| WO | WO 2009/112286 A1 | 9/2009 |

OTHER PUBLICATIONS

Xiaohui Liu, et al., "The Quantum Channel-Time Division Multiplex on Entangled State", Communication Software and Network (ICCSN), IEEE 3$^{rd}$ International Conference on, May 27-29, 2011, pp. 490-493.

Paul D. Townsend, "Quantum cryptography on multi-user optical fibre networks", Nature, vol. 385, 1997, pp. 47-49.

United Kingdom Examination Report under Section 18(3) issued Oct. 25, 2013, in Patent Application No. GB1110364.5.

Office Action issued Oct. 15, 2013 in Japanese Application No. 2012-136553 (With English Translation).

Bernd Fröhlich, et al., "A quantum access network", Nature, vol. 501, Issue 7465, Sep. 2013, pp. 69-73.

Z.L. Yuan, et al., "Gigahertz quantum key distribution with InGaAs avalanche photodiodes", Applied Physics Letters, vol. 92, Issue 20, May 19, 2008, 5 pages.

Z.L. Yuan, et al., "Practical gigahertz quantum key distribution based on avalanche photodiodes", New Journal of Physics, vol. 11, 2009, pp. 1-11.

Office Action issued Feb. 6, 2015 in United Kingdom Application No. GB1110364.5.

J. Chen, et al., "Stable quantum key distribution with active polarization control based on time-division multiplexing", New Journal of Physics, vol. 11, (2009), 13 pages.

Office Action issued May 27, 2015 in United Kingdom Patent Application No. GB1110364.5.

Office Action issued Sep. 28, 2015 in United Kingdom Patent Application No. GB1110364.5.

Office Action issued Dec. 8, 2015 in United Kingdom Patent Application No. GB1519077.0.

* cited by examiner

QUANTUM COMMUNICATION NETWORK

FIELD

Embodiments described herein relate generally to quantum communication systems, and quantum communication methods.

BACKGROUND

In quantum communication systems, information is transmitted between a sender and a receiver by encoded single quanta, such as single photons. Each photon carries one bit of information encoded upon a property of the photon, such as its polarisation, phase or energy/time. The photon may even carry more than one bit of information, for example, by using properties such as angular momentum.

Quantum key distribution which is a technique for forming a shared cryptographic key between two parties; a transmitter, often referred to as "Alice", and a receiver often referred to as "Bob". The attraction of this technique is that it provides a test of whether any part of the key can be known to an unauthorised eavesdropper (Eve). The laws of quantum mechanics dictate that measurement of the photons by Eve causes an unavoidable change to the state of some of the photons. These changes to the states of the photons will cause errors in the bit values formed between Alice and Bob. By comparing a part of their common bit string, Alice and Bob can thus determine if Eve has gained information.

Previous quantum key distribution systems have used a point-to-point link.

BRIEF DESCRIPTION OF THE DRAWINGS

Embodiments will now be described with reference to the following figures.

DETAILED DESCRIPTION OF THE DRAWINGS

Figure 1:
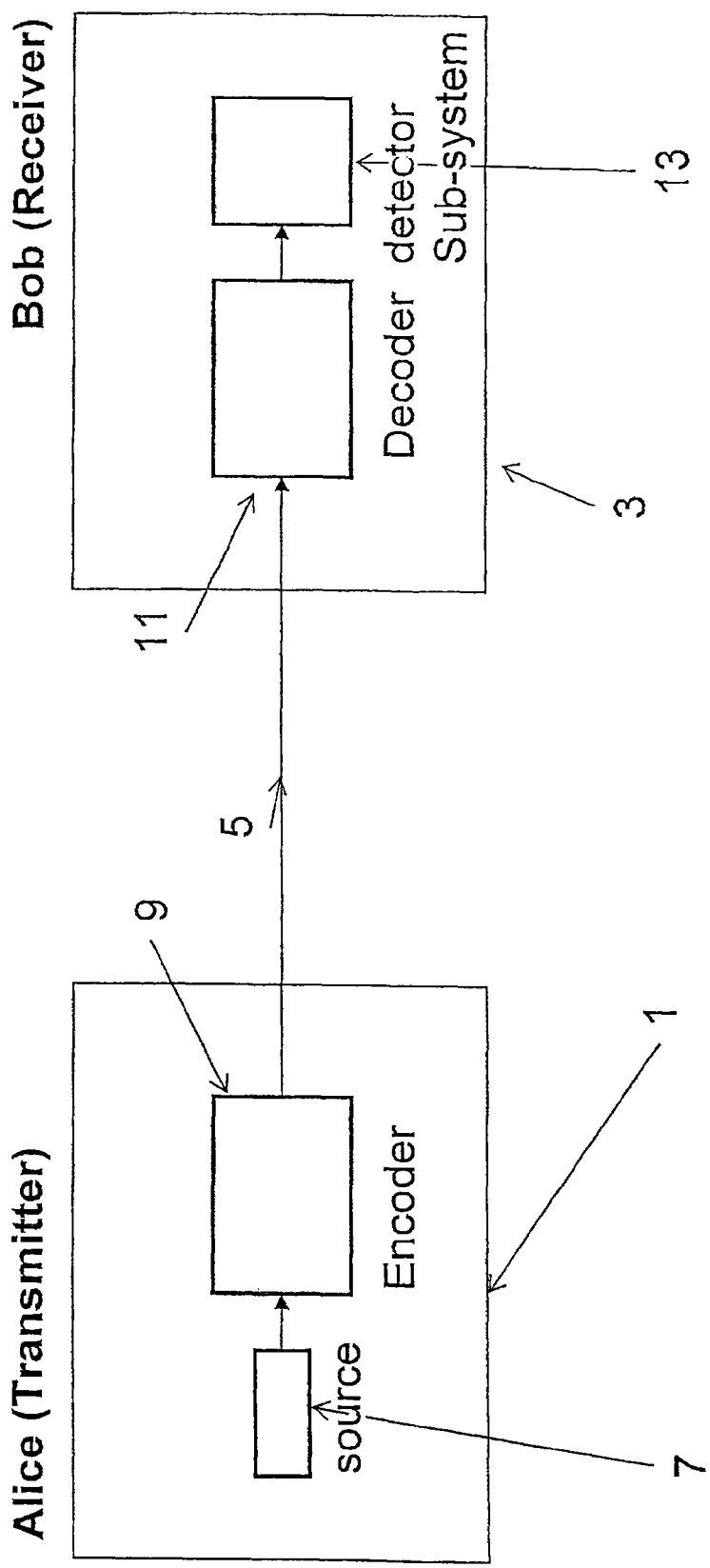
FIG. 1 is a schematic of a prior art point-to-point quantum communication system with a single detector sub-system.

According to one embodiment, a quantum communication system comprising a receiver and a plurality of transmitters, said receiver comprising a detector sub-system, each of said transmitters being configured to emit pulses of radiation, said detector subsystem comprising at least one detector, said detector being configured to detect said light pulses, the system comprising a timing control module, said timing control module being configured to control the number of light pulses received by the detector sub-system, such that just one light pulse from one transmitter reaches the detector sub-system at any one time, the timing control module also allowing the transmitter which sent said pulse to be identified.

In some embodiments, the transmitters are configured to emit pulses of radiation, wherein the average number of photons in a pulse is less than 1. In some embodiments, the pulses are encoded with quantum information.

In some embodiments, the transmitter will transmit both quantum information and also classical reference pulses.

In one embodiment the transmitters and receivers are used to form a key in accordance with a quantum communication protocol. This key can then be used to encrypt, decrypt or authenticate data sent over a classical channel. The classical channel may be provided by a separate fibre or even provided by a wireless channel. In a further embodiment, the classical channel is provided in the same fibre as that used to distribute the key, but classical data is sent at a different wavelength to that used to distribute the key.

In one embodiment, the plurality of transmitters are connected to said receiver through a signal combining device.

In a further embodiment, the timing control module is configured to control transmitters to emit light pulses such that only one pulse from one transmitter enters the combined channel at a time. In an alternative arrangement, the signal combining device is configured to only pass signals from a single transmitter to said receiver at a time. Thus, only pulses from one transmitter arrive at the receiver at any one time, the arrival time.

In one embodiment, each transmitter comprises an encoder and the receiver comprises a decoder. However, an alternative embodiment is possible where a plurality of decoders are provided at the receiver for each encoder, but all decoders use a common detector subsystem.

The signal combining device may be selected from a number of different components, for example, an N×1 passive optical coupler, a fast N×1 optical switch, a wavelength division multiplexing coupler or an optical mirror based N×1 active coupler etc.

In a further embodiment, the detector subsystem comprises at least one gated detector and said timing control module is configured to synchronise the gating of the detector with the arrival time of light pulses at the receiver.

In a further embodiment, the receiver comprises a feedback control unit, said feedback control unit being configured to generate a feedback signal for each transmitter, the receiver being configured to transmit the feedback signal to said transmitter, the transmitter comprising a control element configured to be controlled by the feedback signal from said receiver. For example, if the quantum information is encoded as a phase in an interferometer, the phase of bright reference pulses sent from the transmitter to the receiver is measured at the receiver, the phase is communicated to the transmitter and used as a feedback signal to fix the phase offset of the interferometer. In a further embodiment, the polarisation of the pulses at the receiver is measured, the polarisation is communicated to the transmitter and used as a feedback signal to a polarisation control to fix the polarisation of the pulses arriving at the receiver.

In a yet further embodiment, a feedback control unit is provided at the receiver, said feedback control unit being configured to generate a feedback signal for each transmitter, the receiver comprising a compensating element configured to be controlled by the feedback signal during the arrival time of pulses from the transmitter.

In an embodiment, the timing control module is provided in the receiver and a timing signal to control which transmitters should transmit pulses to said receiver is distributed from said receiver to said transmitters. In a further embodiment, this is achieved using a 1×N passive coupler. In an embodiment the timing control module is provided in the receiver and a timing signal to control which transmitters should transmit pulses to said receiver is distributed from said receiver to said transmitters using said wavelength division multiplexer and a 1×N passive coupler.

The detector subsystem may have just one single photodetector or may have a plurality of single photon detectors depending on the protocol used by the quantum communication system. The detectors may be gated single photon detectors, free running single photon detectors or a combination of both.

In an embodiment, the pulses from said transmitters form a single regular pulse train with time interval matching the clock cycle of the signal used to synchronise the transmitter and receivers.

In one embodiment, a transmitter of said plurality of transmitters are coupled to a unit which is capable of receiving encrypted data, said unit being configured to decrypt said encrypted data using a key established between the transmitter coupled to the unit and the detector subsystem. The received decrypted data may be a control signal, for example, in a SCADA network.

In a yet further embodiment, wherein a transmitter of said plurality of transmitters is coupled to a unit which is capable of sending data, said unit being configured to encrypt said data using a key established between the transmitter coupled to the unit and the detector subsystem. In further embodiments, the unit is capable of both encrypting data to send using the key and decrypting received data.

In the above, the key formed between each transmitter and the receiver is used to encrypt and/or authenticate data sent in either direction between units which are connected to the transmitter and receiver.

When applied to a supervisory control and data acquisition (SCADA) system the key formed between each transmitter and the receiver can be used to encrypt and/or authenticate data sent in either direction between a Remote Terminal Units connected to the transmitter and a Supervisory station connected to the receiver.

In a further embodiment, the said plurality of transmitters, detector subsystem and timing control module form a first network, the quantum communication system further comprising a second network said second network comprising a plurality of nodes, each node being connected to at least one other node to form a pair of connected nodes, wherein one node in each pair of connected nodes comprises a transmitter being configured to emit pulses of radiation, wherein the average number of photons in a pulse is less than 1 and the other of said nodes comprises a detector subsystem, said detector subsystem comprising at least one detector, said detector being configured to detect said light pulses, at least one of said nodes of said second network comprising a detector subsystem of said first network such that information can be transferred between said first and second networks via said node.

Embodiments of the present invention provides a quantum communication method for communicating over a network comprising a receiver and a plurality of transmitters each of said transmitters being configured to emit pulses of radiation, wherein the average number of photons in a pulse is less than 1, said receiver comprising a detector sub-system, said detector subsystem comprising at least one detector, said detector being configured to detect said light pulses, emitting pulses of radiation from said plurality of transmitters;

combining the output of the plurality of transmitters into a single channel;

controlling the pulses that enter said single channel, such that only one pulse from one transmitter enters the channel at a time;

receiving the pulses at the detector subsystem, the transmitter for each pulse being identified by the timing when the pulse was received at the detector.

FIG. 1 is a schematic of a prior art point-to-point quantum communication system with a single detector sub-system. The point-to-point communication system consists of one transmitter 1, i.e., Alice, and one receiver 3, i.e., Bob. Alice and Bob are connected by the quantum channel, in this case, a single mode fibre 5.

In the point-to-point quantum communication system of FIG. 1, information is encoded onto light pulses by changing a quantum parameter of the photons in the pulses such as polarisation or phase. The light pulses will, on average, contain less than one photon.

The transmitter 1 comprises a source 7 of light pulses and an optical encoder 9. The source 7 may comprise a pulsed laser and an optical attenuator. In some arrangements, the optical attenuator is placed after the encoder. In some further arrangements, a semiconductor single photon source is provided, for example, a single photon source comprising a quantum dot.

The transmitter (Alice) 1 is linked to the receiver 3 (Bob) by a quantum channel 5. The receiver 3 comprises a decoder 11 and a detector sub-system 13. In some known arrangements, two single photon detectors are used to form the detector sub-system. Their function is to detect incoming photons from the transmitter 1, and the detection results are used jointly by the transmitter 1 and the receiver 3 to form a shared secret binary sequence, i.e., key.

The quantum channel 5 may be provided by an optical fibre.

Many different protocols have been suggested for conveying information in a point-to-point quantum communication system. A known protocol for distributing a secret key using single photons or coherent pulses is known as BB84.

In BB84, the bit state 0 or 1 is encoded onto a certain physical property of a photon, such as polarisation or phase delay in an interferometer. Each bit (1 or 0) may be represented using two orthogonal states in one of two non-orthogonal bases. One of the states in each basis codes for 0, the other codes for 1. For example, for phase encoding, the first basis may be defined by applying a phase shift of 0° or 180° to a photon passing through an interferometer, whereas the second basis may be defined by applying a phase shift of 90° or 270° to a photon passing through an interferometer. In the BB84 protocol the assignment of bit values to particular qubit states is agreed in advance and fixed. For polarisation encoding, one basis may be defined by vertically or horizontally polarising a photon and the other basis is defined by two polarisation states at 45° to the vertical and horizontal states.

If Bob chooses for a particular photon, the same basis for his measurement as Alice used to encode, he will be able to measure the received state deterministically, or in other words with a theoretical accuracy of 100%. However, if he uses a different basis from Alice there is a finite probability that he will determine the wrong bit value. If the overlap integral between states in the two bases is 0.5 (i.e if the bases are offset by 90° in the case of phase encoding), and Bob chooses a different basis to Alice, he has only a 50% chance of determining the correct result and a 50% chance of error.

After the measurement has been made, Alice and Bob communicate with one another over a classical channel. In the BB84 protocol, Alice and Bob exchange information concerning the phase shift applied by Bob and agree only to keep the results when Bob has used an appropriate phase shift, a process known as sifting. The results from any measurements performed using an incorrect phase shift by Bob are discarded. This means that, typically, the results from half of the measured photons will be discarded.

Other protocols also exist, for example, it is possible to encode information upon distributed phase difference among adjacent pulses. Such a technique is used, in the differential phase shift protocol. In this protocol, phase coherence exists among pulses emitted by the transmitter. The encoder is simply a phase modulator, which applies 0 or 180° phase delay randomly on each optical pulse. The decoder is then a 1-bit Mach-Zehnder interferometer with arm length difference exactly matching the time delay between two adjacent optical pulses emitted by Alice. The detector sub-system comprises two single photon detectors, each of which connects to one output of the 1-bit Mach-Zehnder interferometer.

The entire system operates at a single clock frequency. A synchronisation channel (not shown) between Alice and Bob is required. The synchronisation may be realised through an optical channel provided between the transmitter 1 and receiver 3.

The single photon detectors used in the detector sub-system can be based on semiconductor InGaAs avalanche photodiodes or superconducting nanowire structures. InGaAs APDs are usually operated in gated Geiger mode with thermo-electrical cooling to a temperature ranging from −90 to −10° C. for single photon detection. For high speed single photon detection, they can be operated in the so-called self-differencing mode or sine-wave gating. Superconductor nanowire detectors require deep cooling to cryogenic temperature so as to allow superconductivity.

Figure 2:
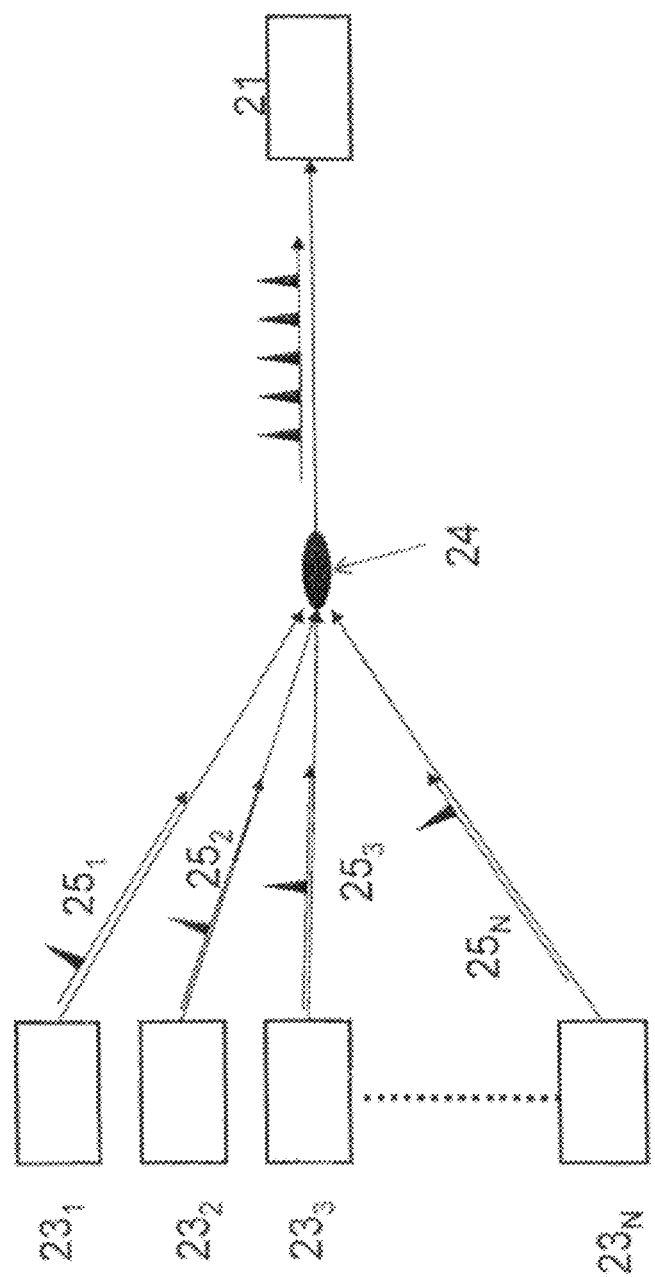
FIG. 2 is a schematic of a quantum communication network in accordance with an embodiment of the present invention with a single quantum receiver receiving quantum signals from multiple transmitters. Signals from multiple transmitters are temporally interleaved using an N×1 passive optical coupler.

FIG. 2 is a schematic of a quantum communication network in accordance with an embodiment of the present invention with a single quantum receiver 21 receiving quantum signals from multiple transmitters $23_1$, $23_2$, $23_3$ ... $23_N$. Signals from multiple transmitters are temporally interleaved using an N×1 passive optical coupler 24. The receiver 21 comprises a decoder and detector sub-system (not shown) as described with reference to FIG. 1.

In this embodiment, N transmitters $23_1$, $23_2$, $23_3$ ... $23_N$ are connected to a single receiver 21 Bob using a passive N×1 passive optical coupler 24. Each transmitter $23_1$, $23_2$, $23_3$ ... $23_N$ is connected to one input of the passive coupler 24 through a fibre link $25_1$, $25_2$, $25_3$ ... $25_N$. The combined output of the coupler 24 is connected with the receiver 21.

In this embodiment, the receiver provides a master clock signal to which each transmitter $23_1$, $23_2$, $23_3$ ... $23_N$ is synchronised. At any receiver clock period, at most one transmitter $23_1$, $23_2$, $23_3$ ... $23_N$ is allowed to transmit a pulse encoded with quantum information. The transmitters may be configured to emit pulses of radiation, wherein the average number of photons in a pulse is less than 1. The receiver comprises a timing control module (not shown) which outputs the master clock signal and allows the receiver to identify which transmitter has transmitted the pulse which it has just received.

The source in each transmitter $23_1$, $23_2$, $23_3$ ... $23_N$ can be controlled such that the output of pulses is delayed to produce a combined optical signal after the N×1 coupler 24 which is a train of pulses with time intervals regulated by the receiver's master clock.

Time slots for each emission for each transmitter $23_1$, $23_2$, $23_3$ ... $23_N$ can be pre-agreed between the transmitters and the receiver to avoid collision of pulses. In this embodiment, to achieve this, the receiver 21 can allocate time slots to each transmitter $23_1$, $23_2$, $23_3$ ... $23_N$. In FIG. 2, each transmitter transmits a pulse in turn with 1/N of the master clock frequency.

These pulses with regular arrivals can be easily detected by the detector subsystem in the receiver 21. In the detector sub-system, single photon detectors can be either gated or free-running.

Following each detection event, the receiver 21 first identifies the transmitter $23_1$, $23_2$, $23_3$ ... $23_N$ which sent the photon which gave rise to the detection event, from the arrival time of the photon. Then, the receiver 21 initiates the sifting process by communicating the time arrival and his decoding basis with the identified transmitter in the same manner as described with reference to FIG. 1. Repeating this process for each detected photon, one of the transmitters $23_1$, $23_2$, $23_3$ ... $23_N$ and the receiver 21 will form a sifted key sequence with lengths of, for example, at least a few thousands bits. Then, the transmitter and the receiver can start error correction and privacy amplification processes to distil a perfectly secret key between them. This post-processing is known and will not be described further here.

In an embodiment, a single access network may have optical fibres of up to 200 km. Fibre lengths in excess of 1 km, 10 km, 20 km may be used.

Networks in accordance with the above described embodiment with many transmitters to one receiver are advantageous because only one detector sub-subsystem is required for this network. Detectors are the most costly part of a QKD system. Moreover, many types of suitable detector need cooling and significant amount of maintenance. By reducing the number of the detectors and placing them in a single location will significantly lower the cost and ease the maintenance.

Systems in accordance with the above embodiment, allow multiple users to access quantum key distribution while using a small amount of detectors.

Systems in accordance with the above embodiment provide a network architecture suitable for forming separate keys between a central station and several distributed nodes, necessary for expanding the utility of QKD. Recent development of high speed single photon detectors allows a new architecture where the detectors are located at the central station and each end point has a transmitter. This approach will allow a multipoint system to be developed where the endpoints contain just simple telecom components that are much more compact and cheap. Placing the detectors at the central station will also ease maintenance and improve the reliability of the system.

Figure 3:
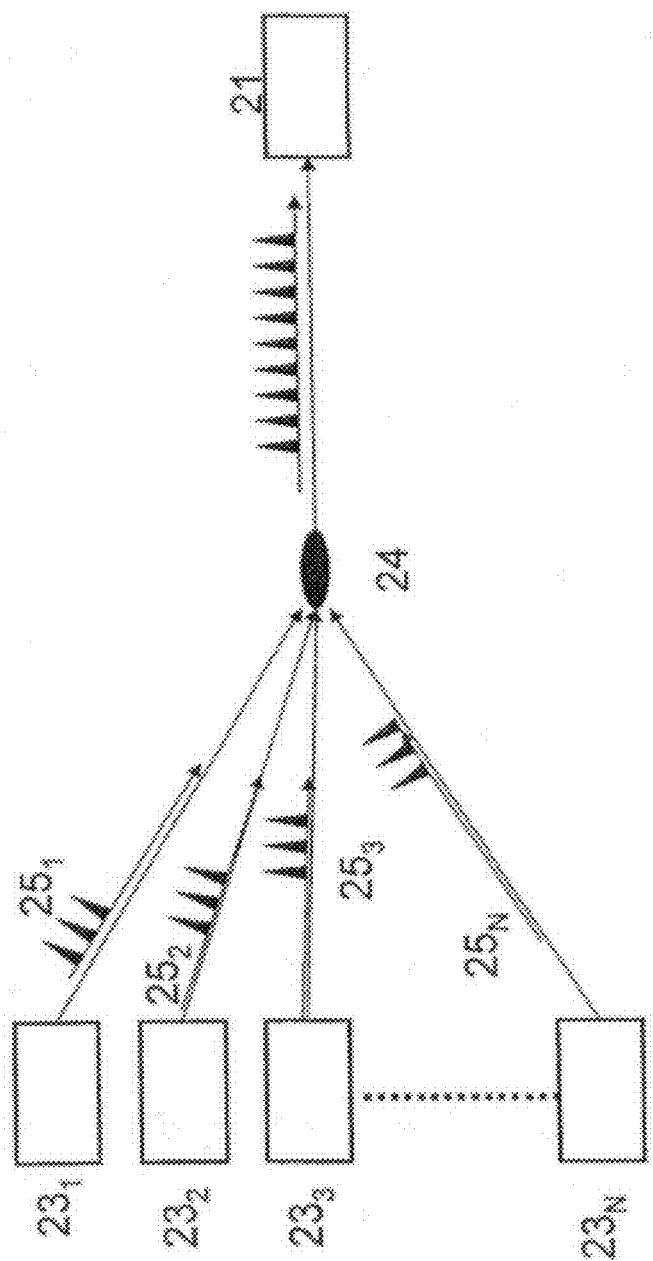
FIG. 3 is a schematic of a quantum communication network in accordance with a further embodiment of the present invention showing a QKD quantum communication network consisting of multiple transmitters and one receiver, where signal packets from each transmitter are coupled using an N×1 passive optical coupler.

FIG. 3 is a schematic of a quantum communication network in accordance with a further embodiment of the present invention showing a QKD quantum communication network consisting of multiple transmitters and one receiver, where signal packets from each transmitter are coupled using an N×1 passive optical coupler.

The network system of FIG. 3 is similar to that of FIG. 2 and to avoid any unnecessary repetition, like reference numerals will be used to denote like features. However, the network system of FIG. 3 has a different transmission pattern for each transmitter $23_1, 23_2, 23_3 \ldots 23_N$. Here, instead of each transmitter transmitting one pulse when it receives its turn to transmit to the receiver, a plurality of pulses will be transmitted. This transmission time slot allocation is advantageous for quantum communication protocols that use the phase coherence between adjacent pulses, such as differential phase shift and coherent one-way etc. For other protocols such as BB84, this arrangement is not absolutely necessary, but may simplify the transmission slot management in the receiver.

FIG. 3 is an example of a quantum access network based on a passive optical network. A passive optical network is a point to multipoint fibre-optic network where the splitting/combining the signal is based on passive components.

Using a single photon detector operating with GHz clock rates allows the detectors to be located at the central station and each end point has a laser source. This approach will allow a Quantum Access Network to be developed where the endpoints contain just simple telecom components that are much more compact and cheap. Placing the detectors at the central station will also ease maintenance and improve the reliability of the system.

An insertion loss of ~9 dB can be expected for a simple 1×8 passive optical coupler. Thus for a typical 20 km drop of low loss standard fibre, an aggregate secure bit rate at the receiver of ~500 kbit/s or 85 kbit/s per user can be expected.

Figure 4:
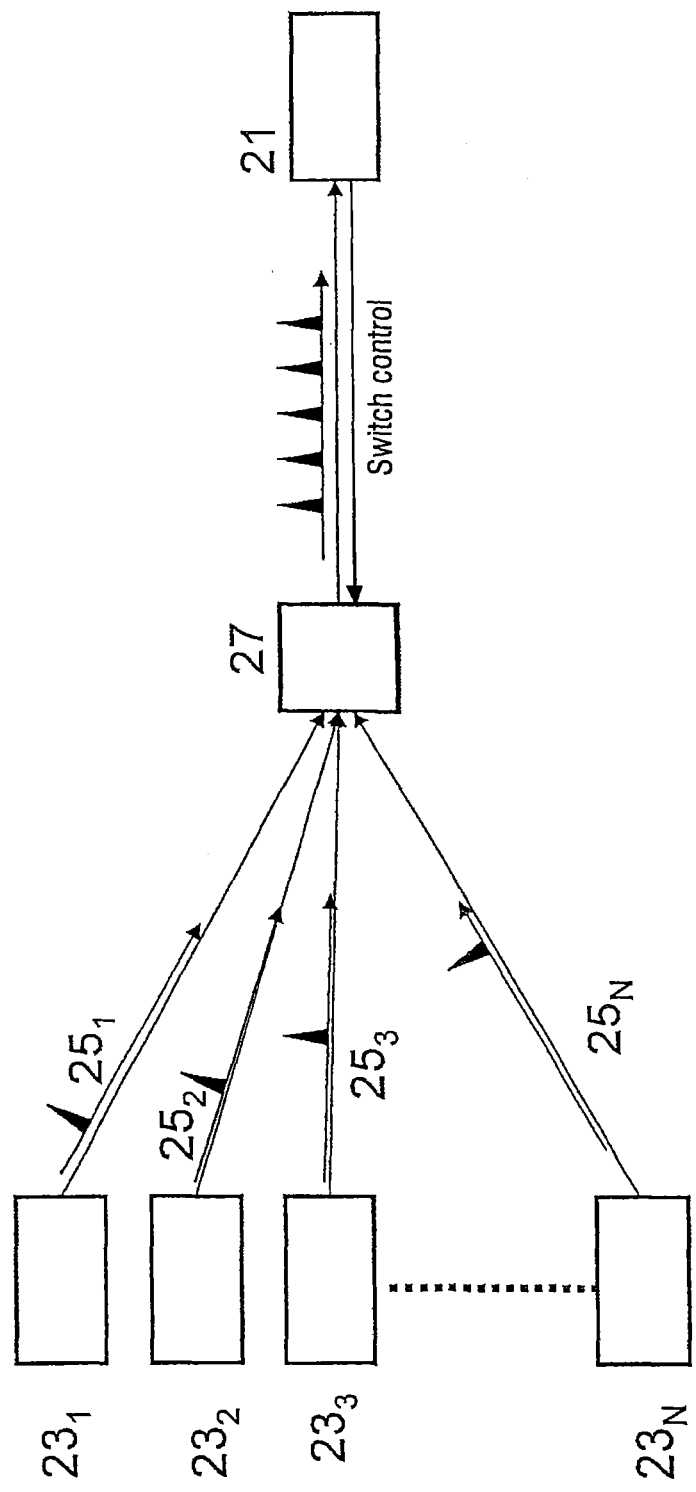
FIG. 4 is a schematic of a quantum communication network in accordance with a further embodiment of the present invention showing a QKD quantum communication network consisting of multiple transmitters and one receiver, where signal pulses from each transmitter are temporally interleaved using a fast optical switch.

FIG. 4 is a schematic of a quantum communication network in accordance with a further embodiment of the present invention showing a QKD quantum communication network consisting of multiple transmitters $23_1, 23_2, 23_3 \ldots 23_N$ and one receiver 21, where signal pulses from each transmitter are temporally interleaved using a fast optical switch.

The network system of FIG. 4 is similar to that of FIG. 2 and to avoid any unnecessary repetition, like reference numerals will be used to denote like features. However, the network system of FIG. 4 replaces the passive N×1 optical coupler (of FIGS. 2 and 3) with an active fast optical switch 27 to combine all the transmitted signals. Such an arrangement may improve signal transmittance in the beam combining. Theoretically a perfect optical switch can have 100% signal transmittance, while a passive N×1 optical coupler have an average transmittance of 1/N for each channel.

The fast optical switch is suitable to combine any kind of transmission slot pattern, such as those shown in FIGS. 2 and 3. Because of its active nature, in this embodiment the switch 27 is also synchronised with the receiver's master clock and controlled by the receiver 21 for switching signal.

Figure 5:
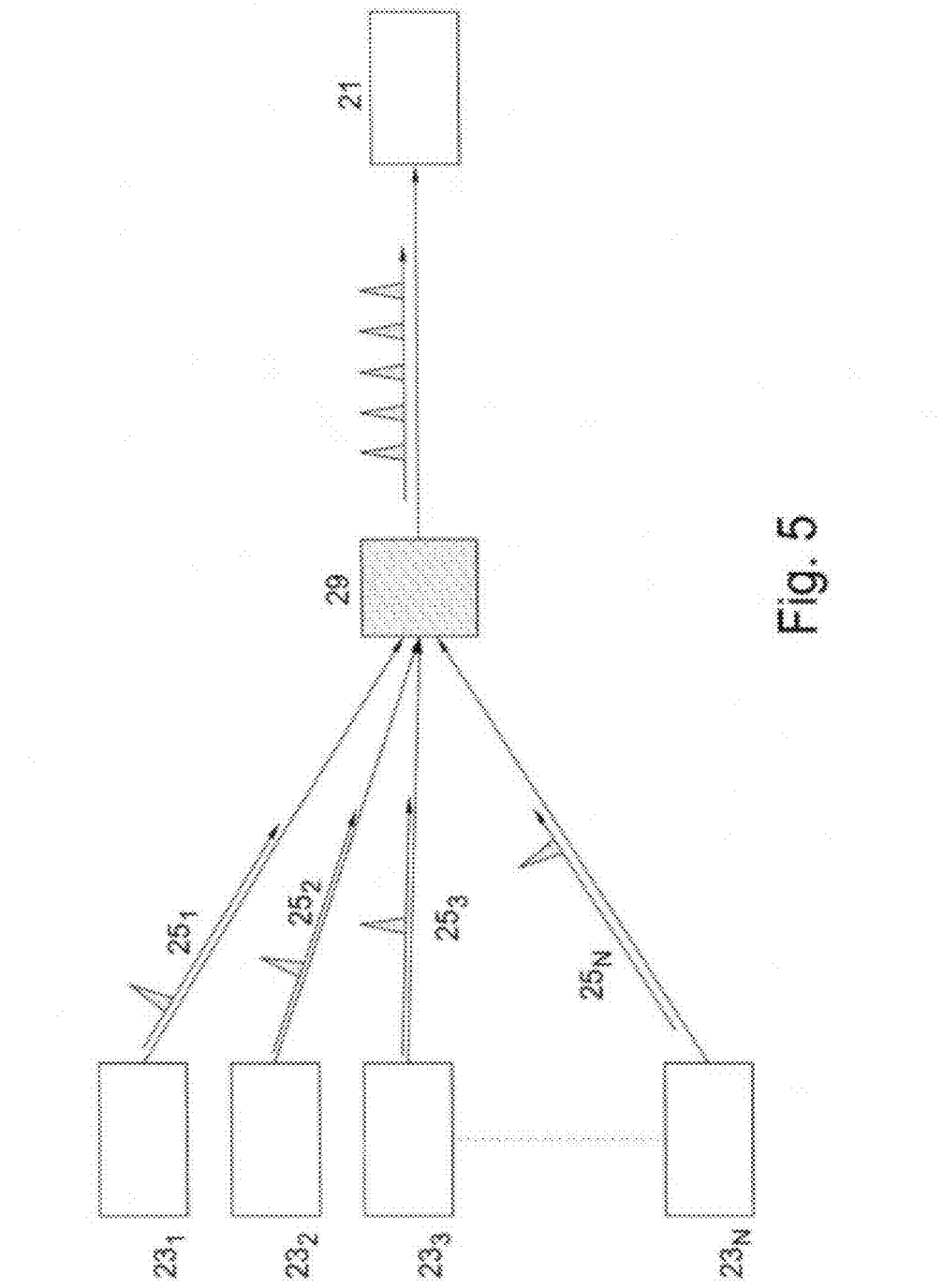
FIG. 5 is a schematic of a quantum communication network in accordance with a further embodiment of the present invention showing a QKD quantum communication network consisting of multiple transmitters and one receiver, where each transmitter emits at a unique wavelength and signals from all transmitters are temporally interleaved using a wavelength-division-multiplexer before entering the receiver.

FIG. 5 is a schematic of a quantum communication network in accordance with a further embodiment of the present invention showing a QKD quantum communication network consisting of multiple transmitters and one receiver, where each transmitter emits at a unique wavelength and signals from all transmitters are temporally interleaved using a wavelength-division-multiplexer (WDM) before entering the receiver.

The network system of FIG. 5 is similar to that of FIG. 2 and to avoid any unnecessary repetition, like reference numerals will be used to denote like features. However, the network system of FIG. 5 replaces the N×1 optical coupler with a WDM coupler to combine all the transmitted signals of different wavelengths. Such an arrangement may give a fixed signal transmittance in the beam combining. Typically, a WDM coupler has a transmission around 3 dB, thus for each channel the transmittance can achieve 50%.

The WDM coupler is suitable to combine any kind of transmission slot pattern, such as those shown in FIGS. 2 and 3.

WDM-couplers can be formed using either thin film WDM splitters or Array Waveguide Grating (AWG) couplers. Taking a typical thin film WDM splitter insertion loss of 3 dB and a drop fibre length of 20 km, a secure bit rate of ~250 kbit/sec per user could be achieved for 8 users. AWG splitters are more expensive and have slightly higher loss, but can allow up to 128 users to be connected to the network.

Figure 6:
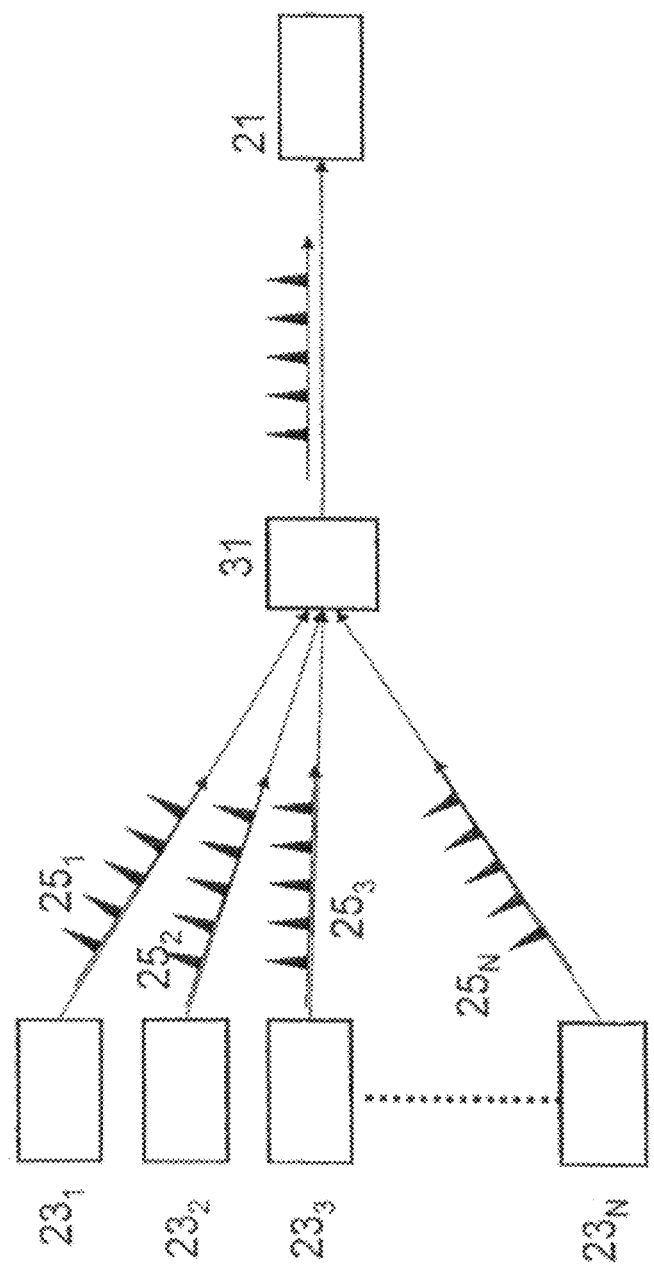
FIG. 6 is a schematic of a quantum communication network in accordance with a further embodiment of the present invention showing a QKD quantum communication network consisting of multiple transmitters and one receiver, where signals of only one transmitter is routed to the receiver using an optical mirror.

FIG. 6 is a schematic of a quantum communication network in accordance with a further embodiment of the present invention showing a QKD quantum communication network consisting of multiple transmitters and one receiver, where signals of only one transmitter is routed to the receiver 21 using an optical mirror 31.

The network system of FIG. 6 is similar to that of FIG. 2 and to avoid any unnecessary repetition, like reference numerals will be used to denote like features. However, the network system of FIG. 6 replaces the N×1 optical coupler with an optical mirror 31 based switch to route only one transmitter to the receiver 21 at a time.

Since this type of switch relies on rotating an optical mirror 31, the switching time is typically much slower than the fast optical switch (of FIG. 4). The switching time is typically in the order of 10 milliseconds or longer, and it is not suitable for switching fast optical pulse packets. Instead, it is used as a routing device which connects only one transmitter to the receiver at a time for a one-to-one quantum communication for duration that is comparable or much longer than the switching time. For example, one connection time may last from 100 milliseconds to 1000 seconds before switching to another transmitter.

The mirror switch can be microelectromechanical systems (MEMS) based. MEMS switches feature low transmission loss (<1 dB) and around 10 milliseconds switching time.

Apart of using individual optical coupler or switch, a combination of couplers and switches can be used together to form a more complex quantum communication network. For example, a number of WDM couplers and an MEMS based mirror switch can be used to form a network to allow many more transmitters to connect to a single receiver.

Figure 7:
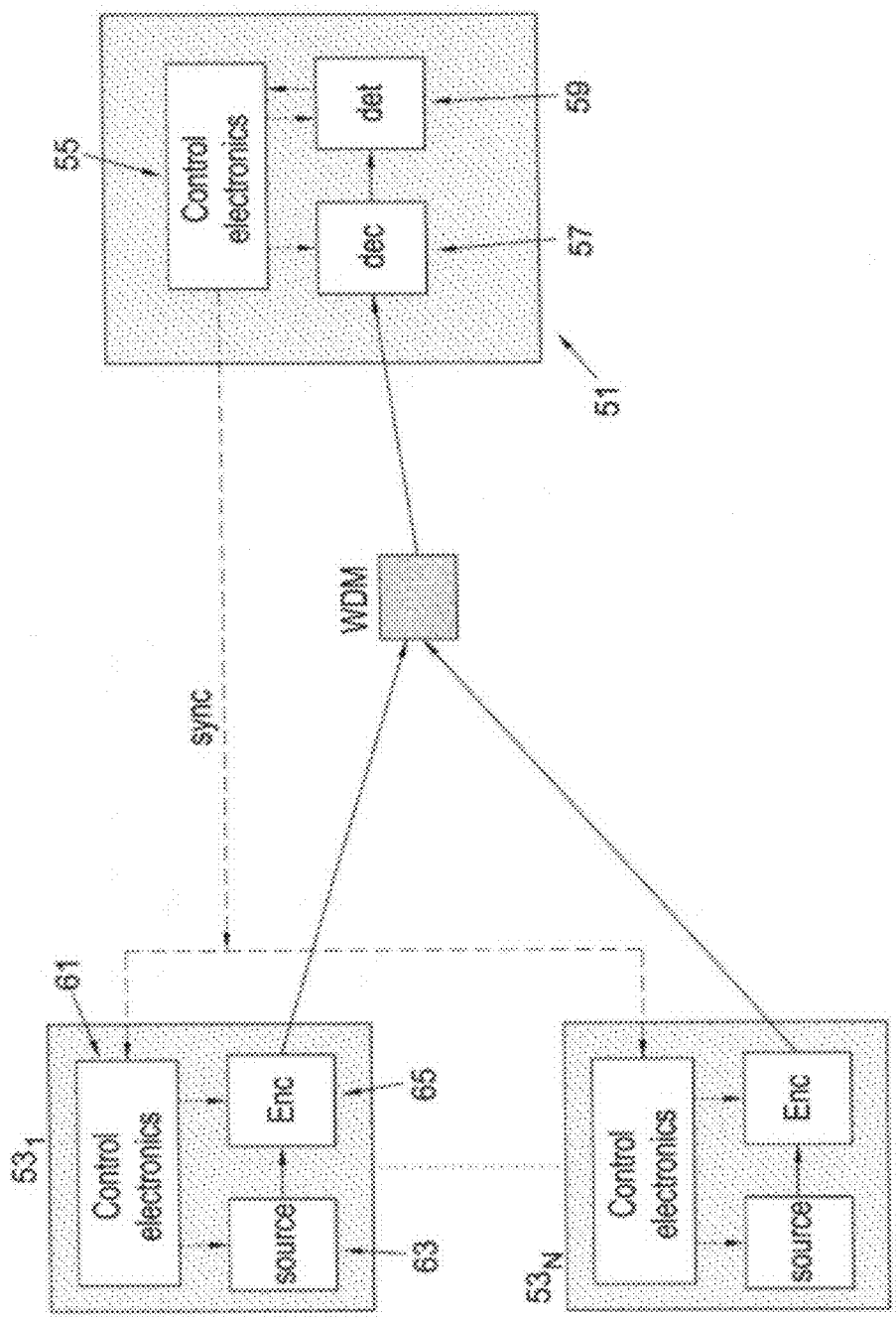
FIG. 7 is a schematic of a quantum communication network in accordance with a further embodiment of the present invention showing all transmitters are synchronised with the receiver.

FIG. 7 is a schematic of a quantum communication network in accordance with a further embodiment of the present invention showing how transmitters may be synchronised with the receiver.

In the network of FIG. 7, as per FIGS. 2 to 6, there is a single receiver 51 which receives signals from N transmitters $53_1 \ldots 53_N$. Inside the receiver 51, there are functional modules comprising control electronics 55, decoder 57 and detector sub-system 59. The control electronics module 55 provides the system master clock (not shown), drives any modulator (not shown) in the decoder 57 and accepts photon detection results from the detector sub-system 59. The control electronics 55 is also responsible for classical communication that is used between the transmitters $53_1 \ldots 53_N$ and the receiver 51 and for error correction and privacy amplification.

Each transmitter 53 comprises control electronics 61, a source 63 and an encoder 65. The control electronics 61 receives the master clock signal and uses this to drive the source 63. The control electronics 61 will also control any modulator provided within the encoder 65.

In this embodiment, the receiver 51 is the provider for the system master clock. The master clock is usually determined by the speed of the single photon detectors in the detector sub-system. For example, for self-differencing InGaAs APDs based single photon detectors, the master clock can be operated at 1 GHz or higher. This master clock drives the decoder and the detector, and provides time reference for photon arrivals.

Transmission of this master clock can be realized optically using fibres between the receiver 51 and each transmitter $53_1 \ldots 53_N$. These fibres can be separated from the quantum channel. For example, the transmitter can deliver the master clock to all transmitters simultaneously through a 1×N passive coupler and fibres. This synchronisation arrangement is suitable for all networks described with reference to FIGS. 2 to 6.

In the case shown in FIG. 5 where a WDM coupler is used combine all transmitted quantum signals, the master clock may be transmitted optically at a wavelength that is different from any of the transmitter but is compatible with the grid of the WDM coupler. In this way, it can pass the WDM coupler and couple to a single mode fibre. The clock signal can then be distributed to each transmitter through a passive 1×N coupler.

The master clock can also be transmitted in cascade mode. For example, the receiver $51_1$ transmits the clock to Alice_1 $53_1$, Alice_1 $53_1$ transmits the clock to Alice 2_$53_2$, and so on.

To provide the clock stability, phase locked loop (PLL) may be used between a clock provider and a clock acceptor. With PLL, the master clock can also be stepped down in frequency before transmission, and then re-synthesized in the clock acceptor.

Figure 8:
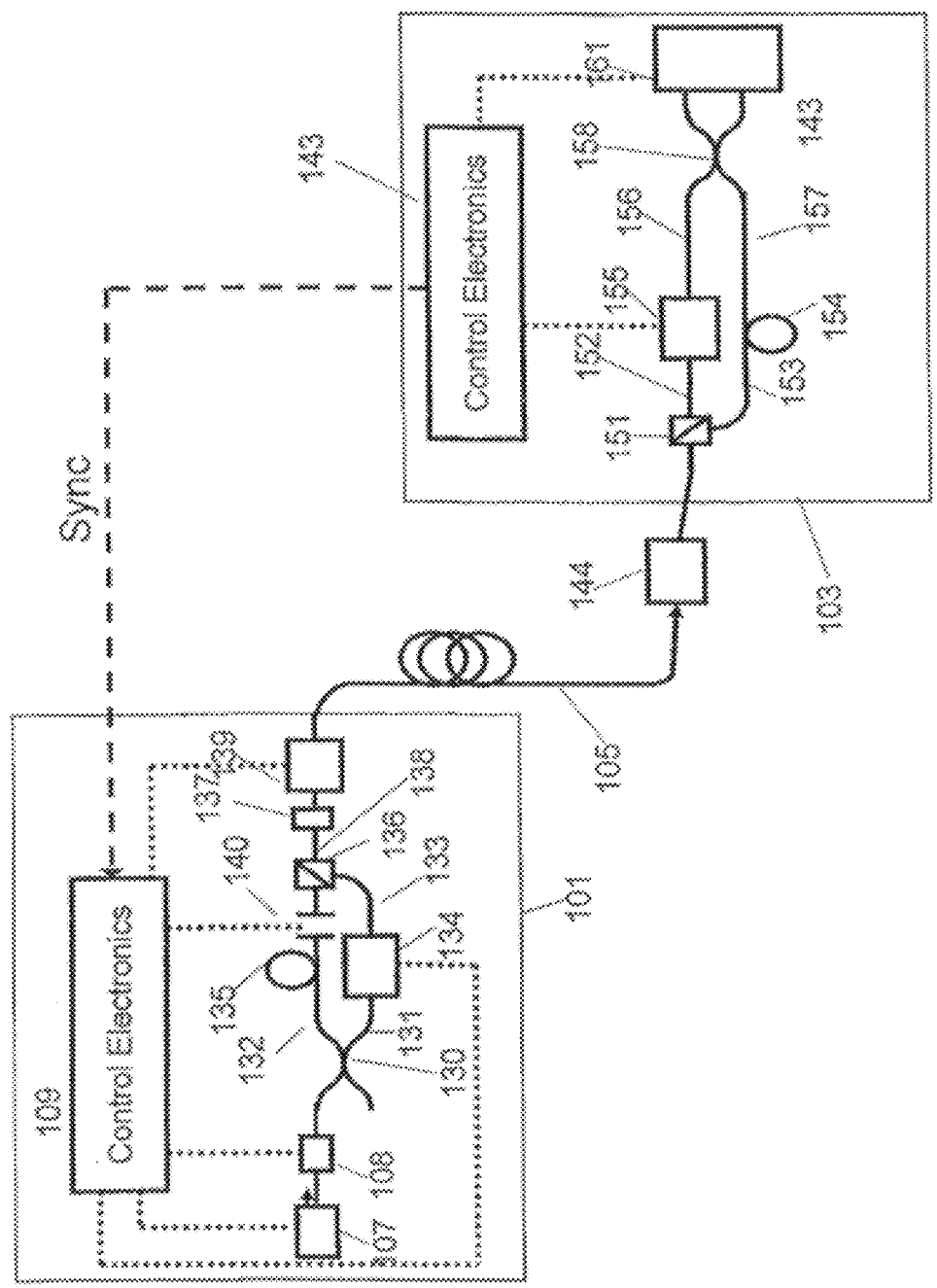
FIG. 8 is a schematic of a quantum communication network in accordance with a further embodiment of the present invention showing detail of a transmitter/receiver using phase encoding in asymmetric Mach-Zehnder interferometer.

FIG. 8 is a schematic of a quantum communication network in accordance with a further embodiment of the present invention showing detail of a transmitter/receiver using phase encoding in asymmetric Mach-Zehnder interferometer. For simplicity, only one transmitter is shown in the drawing.

The transmitter's equipment contains a laser diode 107, an intensity modulator 108, an asymmetric Mach-Zehnder interferometer (AZMI) based encoder 133, a polarisation controller 139, an attenuator 137, and control electronics 109. The intensity modulator 108 is polarisation maintaining.

During each trigger signal by the control electronics 109, the signal laser diode laser 107 outputs one optical pulse. The polarisation of the laser pulses is aligned to be parallel to a particular axis of the polarisation maintaining fibre, usually the slow axis, of the intensity modulator 108. The intensity modulator 108 modulates intensity of each pulse on a pulse-by-pulse basis.

The intensity modulator 108 may be omitted by using a laser diode that allows direct intensity modulation. Direct modulation can be realized by varying amplitude of driving signals applied to the laser diode 107.

After the intensity modulator 108, the signal pulses are then fed into the imbalanced Mach-Zehnder interferometer 133 through a polarisation maintaining fibre coupler 130. Signals are coupled into one axis, usually the slow axis of the polarisation maintaining fibre.

The long arm 132 of the interferometer 133 contains an optical fibre delay loop 135 and a variable delayline 140, while the short arm 131 contains a fibre optic phase modulator 134. The length difference of the two arms 131 and 132 corresponds to an optical propagation delay of $t_{delay}$.

The two arms 131, 132 are combined together with a polarisation beam combiner 136 into a single mode fibre 138. The fibre inputs of the polarisation beam combiner 136 are aligned in such a way that only photons propagating along particular axes of the polarisation maintaining fibre are output from the combiner 136. Typically, photons which propagate along the slow axis or the fast axis are output by combiner 136 into single mode fibre 138.

The polarising beam combiner 136 has two input ports, an in-line input port and a 90° input port. One of the input ports is connected to the long arm 132 of the interferometer 133 and the other input port is connected to the short arm 131 of the interferometer 133.

Only photons polarised along the slow axis of the in-line input fibre of the in-line input port are transmitted by the polarising beam combiner 136 and pass into the fibre 138. Photons polarised along the fast axis of the in-line input fibre of the input port are reflected and lost.

Meanwhile, at the 90° input port of the beam coupler 136, only photons polarised along the slow axis of the 90° input fibre are reflected by the beam combiner 136 and pass into the output port, while those polarised along the fast axis will be transmitted out of the beam combiner 136 and lost.

This means that the slow axis of one of the two input fibres is rotated by 90° relative to the output port. Alternatively the polarisation may be rotated using a polarisation rotator before one of the input ports of the polarising beam combiner.

Thus, photon pulses which passed through the long 132 and short arms 131 will have orthogonal polarisations.

A photon travelling through the long arm 132 will lag that travelling through the short arm 131 by a time of $t_{delay}$ at the exit 138 of the interferometer 133.

Signals are then strongly attenuated by the attenuator 137 so that the average number of photons per pulse μ<1 after the polarisation controller 139. The attenuated pulses are then transmitted to the receiver Bob 103 along an optical fibre link 105 and a combining/routing device 144. Device 144 can be a passive coupler, WDM coupler, fast switch or MEMS based switch.

Bob's equipment 103 comprises an asymmetric Mach-Zehnder interferometer 156, a detector subsystem 161 containing two single photon detectors connected to the two outputs of interferometer 156 and control electronics 143.

Bob's interferometer 156 contains an entrance polarising beam splitter 151, a long arm 153 containing a delay loop 154 is connected to an output of beam splitter 151, a short arm 152 containing a phase modulator 155 is connected to the other output of said beam splitter 151, and an exit polarisation maintaining 50/50 fibre coupler 158 coupling the output from the long 153 and short 152 arms. All components in Bob's interferometer 156 are polarisation maintaining.

Bob receives the transmitted signal received from the combining/routing device 144. The signal pulses are fed into Bob's interferometer 156. An entrance polarising beam splitter 151 divides the incident pulses with orthogonal linear polarisations. The two outputs of the entrance polarisation beam splitter 151 are aligned such that the two output polarisations are both coupled into a particular axis, usually the slow axis, of the polarisation maintaining fibre. This ensures that signal pulses taking either arm will have the same polarisation at the exit 50/50 polarisation maintaining coupler 158. The long arm 153 of Bob's interferometer 156 contains an optical fibre delay loop 154, and the short arm 152 contains a phase modulator 155. The two arms 152, 153 are connected to a 50/50 polarisation maintaining fibre coupler 158 with a single photon detector attached to each output arm. Two single photon detectors form the detector sub-system 161.

Due to the use of polarising components, there are, in ideal cases, only two routes for a signal pulse travelling from the entrance of Alice's encoding interferometer 133 to the exit of Bob's interferometer 156:
  i. Alice's Long Arm 132—Bob's Short Arm 152 (L-S) and
  ii. Alice's Short Arm 131—Bob's Long Arm 153 (S-L).

The variable delay line 140 at Alice's interferometer 132 is adjusted to make the propagation time along routes (i) and (ii) almost equal, within the signal laser coherence time which is typically a few picoseconds for a semiconductor distributed feed back (DFB) laser diode, and thereby ensure interference of the two paths.

The detectors in the detector sub-system 161 can be gated or free-running. In the case of gated detectors, the detectors must be gated on during the arrival of those photons that experience interference, i.e., photons travelling through the short arm of one interferometer and the long arm of the other interferometer. Self-differencing avalanche photodiodes, or sine-wave gating avalanche photodiodes are suitable for single photon detection in this application.

Due to non-ideal polarisations, some photons travel either both short arms or both long arms, thus arriving at the detector sub-system 161 with a time delay of $\pm t_{delay}$ respective with interfering photons. These non-interfering photons do not contribute to the key generation of key rate. Therefore, detection results of these photons should be discarded.

In order to avoid contamination of interfering photons, appropriate $t_{delay}$ must chosen to ensure that (1) $t_{delay}$ is longer than the detector time resolution and (2) $t_{delay}$ is shorter is than the receiver's system clock period. In a high speed QKD system, a convenient choice of $t_{delay}$ is half of the system clock period. For example, for a 1 GHz receiver, $t_{delay}$ is 500 picoseconds.

The clock synchronisation between the transmitter and the receiver can be realised as shown the description of FIG. 7.

The system in FIG. 8 is suitable for implementing the standard four-state BB84 protocol, or the decoy-state BB84 protocol. The standard BB84 protocol does not require the intensity modulator 108 in the transmitter's apparatus, while the decoy-state BB84 requires the intensity modulator to produce decoy pulses.

In the four-state protocol, which is sometimes referred to as BB84, Alice sets the voltage on her phase modulator to one of four different values, corresponding to phase shifts of 0°, 90°, 180°, and 270°. Phase 0° and 180° are associated with bits 0 and 1 in a first encoding basis, while 90° and 270° are associated with 0 and 1 in a second encoding basis. The second encoding basis is chosen to be non-orthogonal to the first. The phase shift is chosen at random for each signal pulse and Alice records the phase shift applied for each clock cycle.

Meanwhile Bob randomly varies the voltage applied to his phase modulator between two values corresponding to 0° and 90°. This amounts to selecting between the first and second measurement bases, respectively. Bob records the phase shift applied and the measurement result.

To secure against the photon number splitting attack, the transmitter replaces some of her signal pulses with decoy pulses of different average intensities. Following the decoy protocol, the transmitter and the receiver are able to bound the information that may be leaked to eavesdroppers by measuring the transmittances and quantum bit error ratios of signal and decoy pulses.

During quantum communication, a number of physical parameters need to be actively stabilized, including the arm length matching between asymmetric Mach-Zehnder interferometers, the photon polarisation, and the photon arrival times.

The arm length matching can be realised through actively adjusting the tuneable delay line 140 based on the feedback signal transmitted by Bob. This feedback can be the quantum bit error ratio (QBER), which is minimised by tuning the tuneable delay line 140. The QBER is available to Alice only after each error correction process. The latency in determining the QBER allows compensation of only slow variation of arm lengths. It is possible to achieve faster compensation, by sending strong reference pulses substituting a small fraction of signal/decoy pulses. These reference pulses are not modulated by either Alice or Bob, and interference of the reference pulses indicates the status of the arm length matching. Detection results of the reference pulses can be transmitted to Alice by Bob to be used as a feedback for Alice to adjust her tuneable delay line 140.

The variable fibre delay line 140 acts as a control unit and can be an air-gap, or a fibre stretcher, driven by a piezo-electric actuator. Alternatively, the two delays can be balanced by carefully controlling the length of fibre in Alice's 133 and Bob's 156 interferometers. Fine adjustment of the length of the two optical paths can be achieved through either tuning the DC bias in Alice's phase modulator 134 or adding an AC offset to the driving signal applied to the phase modulator 134.

The variable delay line 140 can also be omitted when Bob 103 to alter the phase delay using his phase modulator 155. In this case, Bob's receiver comprises a control unit (not shown) to compensate variations of arm lengths for multiple transmitters, a different AC offset must be applied to each incoming pulse according to the origin of the pulse. These AC offsets are variable in amplitude.

The polarisation drift can be actively stabilized using the polarisation controller 139. Ideally, all photons passing through the encoder and decoder experience the interference at the coupler 158 and contribute to the key formation. However, polarisation drift in the fibre 105 will cause photons to be routed to the non-interfering paths, such as photons passing through either both long arms or short arms of the two interferometers. These non-interfering photons do not contribute to the key formation. They are automatically rejected in the case with gated photon detectors, or can be rejected using a timing discrimination window in the detector subsystem with free-running single photon detectors. In either case, polarisation drift reduces the photon count rate of interfering photons. By optimising this count rate, Alice can correct the polarisation drift by adjusting the polarisation controller 139.

Another drift is the photon arrival time at the detector sub-system 161. This can also be corrected for by tuning the trigger time to the laser diode 107 based on the photon detection results in the detector sub-system 161.

Figure 9:
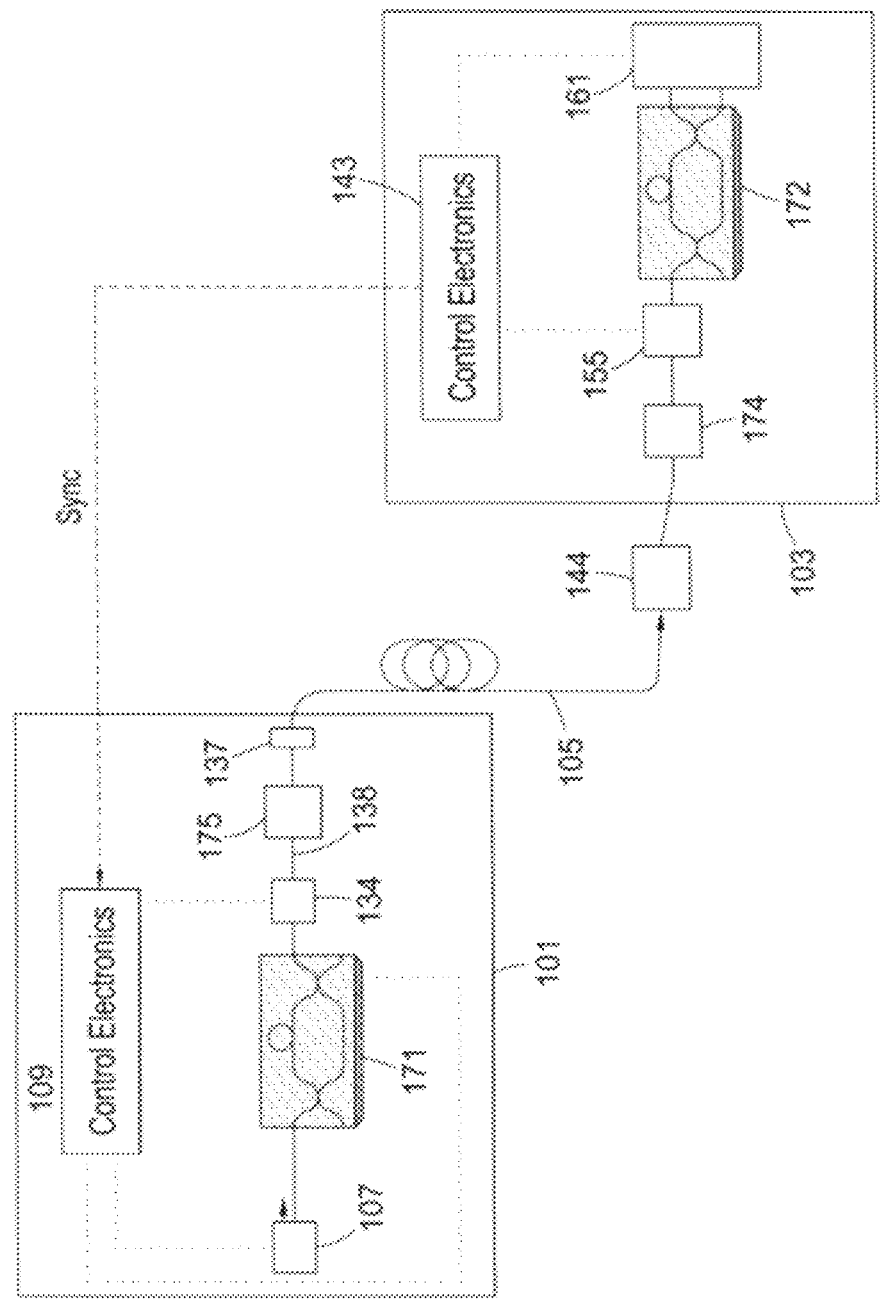
FIG. 9 is a schematic of a quantum communication network in accordance with a further embodiment of the present invention showing detail of a transmitter/receiver using phase encoding in asymmetric Mach-Zehnder interferometer based on planar lightwave circuits.

FIG. 9 is a schematic of a quantum communication network in accordance with a further embodiment of the present invention showing detail of a transmitter/receiver using phase encoding in asymmetric Mach-Zehnder interferometer based on planar lightwave circuits (PLCs). For simplicity, only one transmitter is shown in the drawing.

The network system of FIG. 9 is similar to that of FIG. 8 and to avoid any unnecessary repetition, like reference numerals will be used to denote like features. However, the transmitter and receiver of FIG. 9 replace the fibre based asymmetric Mach-Zehnder interferometers 133, 153 with PLC based interferometers 171, 172.

The transmitter's equipment contains a laser diode 107, a PLC based asymmetric Mach-Zehnder interferometer (AZMI), a phase modulator 134, a polarisation scrambler 175, an attenuator 137, and control electronics 109.

During each trigger signal by the control electronics 109, the signal laser diode laser 107 outputs one optical pulse of variable intensity. The intensity of each pulse is controlled by the control electronics 109.

To implement the standard BB84 protocol, all pulses have same intensity. For implementing decoy-state BB84 protocol, each pulse can be set to be one of several different intensities. This can be realised through outputting driving pulse of different voltage amplitude to the diode laser 107.

The output of the laser diode 107 is fed into PLC 171.

PLC 171 is an asymmetric Mach-Zehnder interferometer. Similar to the AZMI 133 of FIG. 8, PLC 171 has also a short arm and a long arm. Both entrance and exit beam splitters have 50/50 splitting ratio.

After passing through the PLC 171, each laser pulse is split into a pulse pair of equal intensities, separated by a time delay $t_{delay}$ corresponding to the arm length difference.

The pulse pair is then fed into a phase modulator 134. Laser diode 107 and PLC 171 are aligned so that photons feeding into a phase modulator 134 have a fixed polarisation. This fixed polarisation is typically linearly polarised along the slow axis of the input fibre of the phase modulator 134. The phase modulator 134 is driven by control electronics 109 in such a way that only the early pulse of each pair is modulated.

The combination of PLC 171 and the phase modulator 134 makes up a signal encoder.

Signals are then polarisation scrambled by a polarisation scrambler 175 before being strongly attenuated by the attenuator 137 so that the average number of photons per pulse $\mu<1$ after leaving Alice's apparatus. The attenuated pulses are then transmitted to the receiver Bob 103 along an optical fibre link 105 and a combining/routing device 144. Device 144 can be a passive coupler, WDM coupler, fast switch or MEMS based switch.

Bob's equipment 103 comprises a PLC asymmetric Mach-Zehnder interferometer 172, a detector subsystem 161 containing two single photon detectors, and control electronics 143.

Bob's PLC 172 is identical to PLC 171 in Alice 101.

Bob receives the transmitted signal received from the combining/routing device 144. The signal pulses are first filtered by a polariser 174, modulated by a phase modulator 155, and then fed through the PLC 172. The two outputs of PLC 172 are connected to the detector sub-system 161 comprising two single photon detectors.

Phase modulator 155 is controlled by control electronics 143, and only the late pulse of each pulse pair transmitted from Alice is modulated.

There are three routes for a signal pulse travelling from the laser diode 107 to an input of Bob's detector subsystem 161:
  i. Short arm of Alice PLC 171—short arm of Bob's PLC 172 (S-S)
  ii. Short arm of Alice PLC 171—long arm of Bob's PLC 172 (S-L)
  iii. Long arm of Alice PLC 171—short arm of Bob's PLC 172 (L-S)
  iv. Long arm of Alice PLC 171—Long arm of Bob's PLC 172 (L-L)

As Alice and Bob have PLCs of identical arm lengths difference, routes S-L and L-S are indistinguishable and will therefore experience interference.

Photons travel either both short arms (S-S) or both long arms (L-L), thus arriving at the detector sub-system 161 with a time delay of $\pm t_{delay}$ respective with interfering photons (S-L and L-S). These non-interfering photons do not contribute to the key generation. Therefore, detection results of these photons should be discarded.

The detectors in the detector sub-system 161 can be gated or free-running.

In order to avoid contamination of interfering photons, appropriate $t_{delay}$ must chosen to delay is ensure that (1) $t_{delay}$ is longer than the detector time resolution and (2) $t_{delay}$ is shorter than the receiver's system clock period. In a high speed QKD system, a convenient choice of $t_{delay}$ is half of the system clock period. For example, for a 1 GHz receiver, $t_{delay}$ is 500 picoseconds. Such a delay can be easily engineered for a PLC.

The clock synchronisation between the transmitter and the receiver can be realised as shown the description of FIG. 7.

The system in FIG. 9 is suitable for implementing the standard four-state BB84 protocol, or the decoy-state BB84 protocol.

During QKD, PLCs 171 and 172 are temperature controlled to maintain constructive interference between routes S-L and L-S when the phase modulations applied on phase modulators 134 and 174 have 0 phase difference.

Use of a combination of the polarisation scrambler 175 and the polarizer 174 removes need for polarisation stabilization at the expense of an extra 3 dB channel loss.

Drift in arrival times of photons taking routes S-L and L-S at the detector sub-system 161 can be corrected for by tuning the trigger time to the laser diode 107 based on the photon detection results in the detector sub-system 161.

FIG. 10*a* is a schematic of a quantum communication network in accordance with a further embodiment of the present invention showing detail of a transmitter/receiver using distributed phase encoding. In particular, the drawing shows optics for implementing differential phase shift protocol. For simplicity, only one transmitter is shown in the drawing.

The communication system of FIG. 10*a* uses coherence between adjacent pulses in order to distributed a secure key.

The transmitter sender 201 comprises a continuous-wave coherent laser diode 207 which outputs to an intensity modulator 208, followed by a phase modulator 211. The intensity modulator 208 modulates the cw input laser emission into optical pulses, controlled by the control electronics. The optical pulses are then further modulated in phase by randomly either 0 or 180 degrees in modulator 211. The signal is then attenuated by attenuator 213 which ensures that there is less than one photon per pulse for each pulse. This is then transmitted down fibre 205 to receiver 203 through a beam combining/routing device 244, which can be a passive coupler, a WDM coupler or an optical switch.

Receiver 203 comprises an interferometer 253. Interferometer 253 comprises a first beam splitter 215 which directs photons either down short arm 256 or long arm 257. The long arm 257 and the short arm 256 are recombined at second beam splitter 258 which then outputs to a detector subsystem 261 comprising two single photon detectors, which can be based on either semiconductor avalanche photodiodes or superconducting devices.

The sender 201 sends a pulse train with M pulses (M2) where each pulse is modulated by either a 0 phase shift or a phase shift of 180 degrees, as shown in FIG. 10b. At the receiver's side, the received pulse train is split into two paths: the short arm 256 and the long arm 257.

The time delay between the short arm 256 and the long arm 257 corresponds to exactly one clock period of the system master clock, so that the pulse train passing through the short arm 256 will interfere its identical copy, but delayed by one clock cycle, passing through the long arm 257 at the 50/50 coupler of 258. A photon exits from the top output or the bottom output of the fibre coupler 258 will depend on the phase difference between adjacent optical pulses.

The detector sub-system 261 registers the interference results of M−1 pulses. The receiver informs the transmitter the arrival time of each detected photon, but not the information of which detector registering the photon, to the corresponding transmitter. Using photon detection and modulation information, the receiver and the corresponding transmitter can form a shared raw key. A perfectly secret key can be distilled after error correction and privacy amplification provided that the quantum bit error ratio is below a certain threshold.

For each pulse train containing M pulses, the receiver must allocate M+1 clock cycle slots for detecting the photon interference. Therefore, the differential phase shift protocol has an intrinsic efficiency of M/(M+1). A higher efficiency can be achieved by increasing M. For example, M=1000 will give an efficiency of 99.9%.

Figure 10:
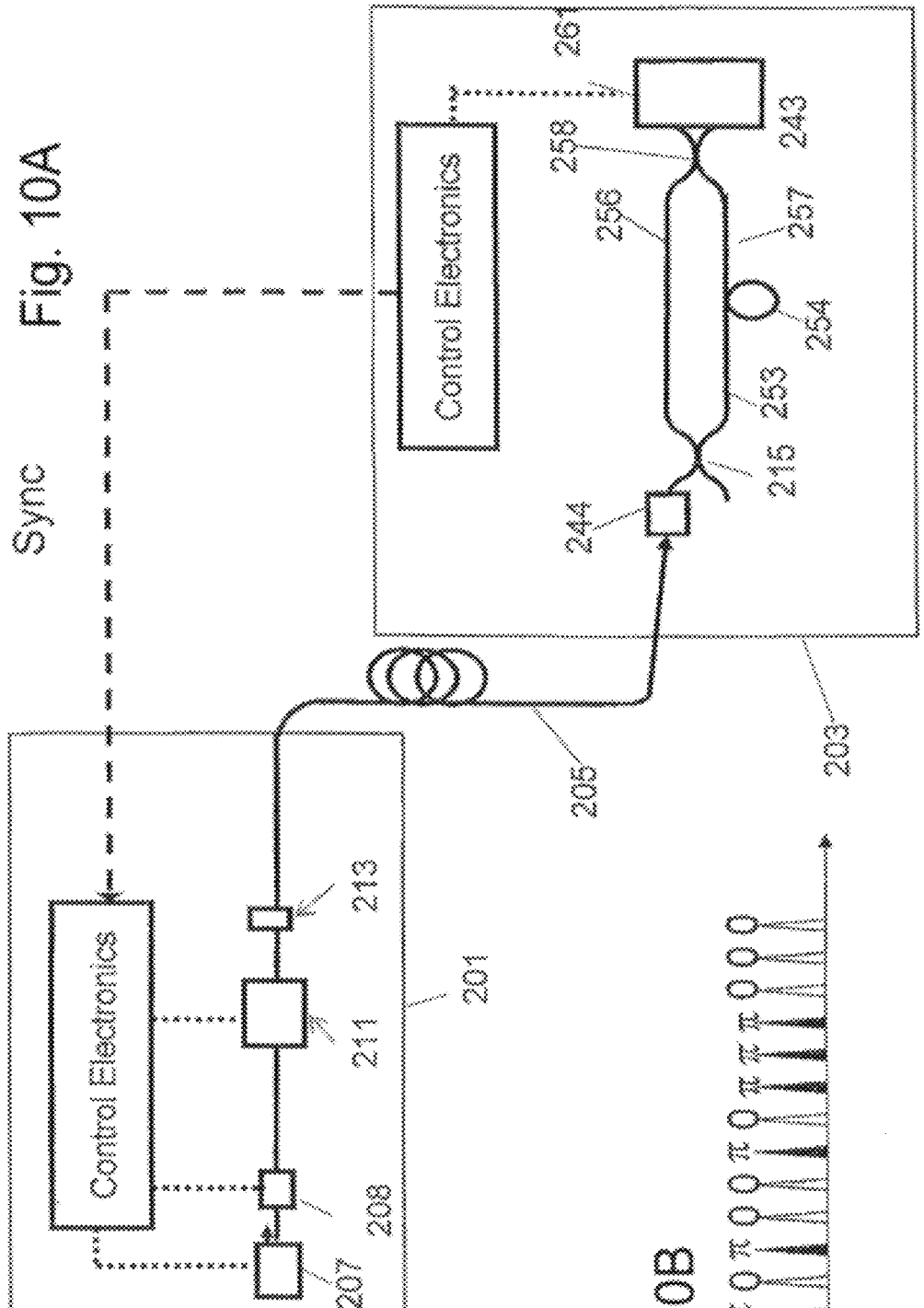
FIG. 10a is a schematic of a quantum communication network in accordance with a further embodiment of the present invention showing detail of a transmitter/receiver using distributed phase encoding.
FIG. 10b illustrates a modulated pulse train transmitted by the transmitter.

The systems of FIG. 8, FIG. 9 and FIG. 10 are just examples on how to implement a QKD network with multiple transmitters sharing a single receiver. Other quantum communication protocols and optical setups can also be implemented, for example, coherent-one-way protocol. To implement such protocol requires use of relevant light sources, encoders and decoders. Multiplexing of signals from multiple transmitters remain the same as what is shown in FIGS. 2-6.

Figure 11:
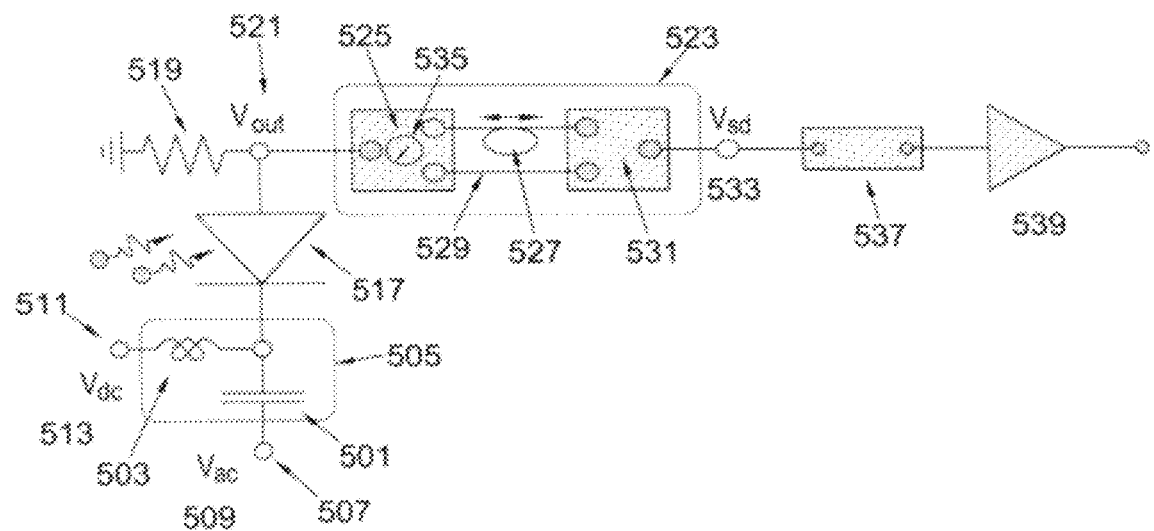
FIG. 11 is a schematic of a detector which may be used in the detector subsystem of quantum communication systems in accordance with embodiments the present invention.

FIG. 11 shows a high speed single photon detector which may be used with systems in accordance with embodiments of the present invention. If a higher speed detector used, the number of transmitters used can be increased while still allowing the netword to function on useful timescales.

A capacitor 501 and inductor 503 comprise a bias-tee 505, which is used to combine an AC modulation voltage, $V_{ac}$, 507 from an AC voltage source 509 and fixed DC bias $V_{dc}$, 511 from a DC bias source 513. The AC voltage is applied to the arm of the bias-tee which comprises capacitor 501 and the DC voltage is applied to the arm of the bias-tee which comprises inductor 503. The combined AC and DC bias form an avalanche photodiode (APD) bias voltage $V_{apd}$, 515. In one embodiment this APD bias voltage 515 is applied to an Indium Gallium Arsenide (InGaAs) based APD 517, although the APD material type is not limited to InGaAs; it could be silicon or germanium depending on the wavelength sensitivity desired.

The photocurrent induced by an avalanche arising from photon detection results in a voltage across a series resistor 519, which corresponds to an output voltage, $V_{out}$, 521.

Large periodic capacitive response resulting from high speed operation of APD conceals any weak avalanches. A self-differencing circuit is employed 523 to isolate the signal from the avalanche. The self differencing circuit comprises a signal divider 525 which is connected to two electrical lines 527 and 529 which output the divided signal and a signal combiner 531 for combining the signal from the two output lines. One of the electrical output lines 527 and 529 comprises a delay so that the signal from one of the lines is delayed before combination.

The APD output voltage, $V_{out}$, 521 is input into signal divider 525, which divides the signal into two closely equal components. A potentiometer 535 is used to balance the dividing ratio and further equate the two components. Since one of the electrical delay lines 527 is longer than the other 529, one of these components will necessarily be delayed.

The delay is selected to be an integer number of gating periods T supplied by the AC voltage source 513, and the delay line 527 is chosen to be adjustable in order to tune the delay independently of T.

When these two signals are input into a signal differencer 531, they are subtracted one from the other and the strong periodic capacitive response is largely cancelled leaving behind a weak self-differencer output voltage, $V_{sd}$, 533. It is common to use a 1 GHz low-pass filter 537 and linear amplifier 539 to further improve the quality of $V_{sd}$, 533.

This allows weak avalanches to be revealed in the self-differencer output, $V_{sd}$, 533. However, successful cancellation of the capacitive response depends strongly on the cycle-to-cycle jitter (frequency stability) of the APD AC driving signal.

Next, applications of the networks will be discussed.

Figure 12:
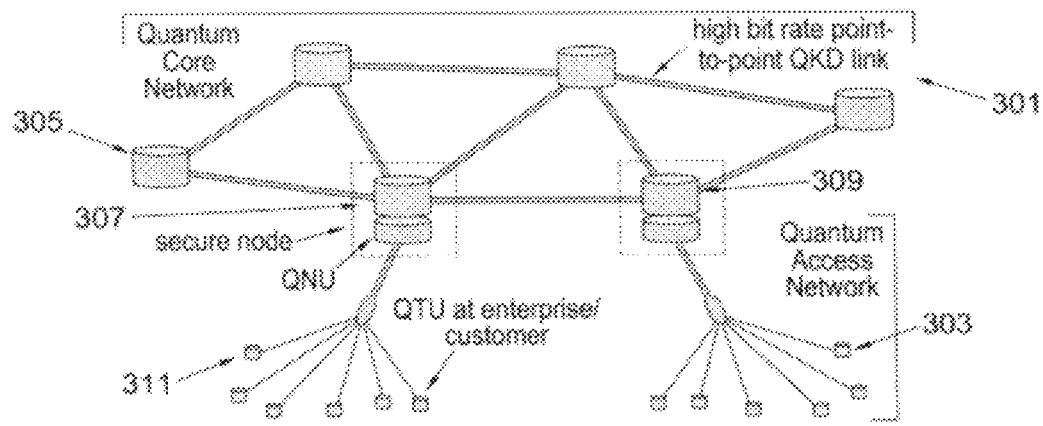
FIG. 12 is a schematic of a quantum communication system in accordance with an embodiment of the present invention.

FIG. 12 shows a network which can be used for distributing a quantum key. The network comprises two subnetworks: a quantum core network 301 and a multiple quantum access network 303.

The quantum core network 301 comprises a plurality of secure nodes 305. In this particular embodiment, each node 305 is connected directly to each of its adjacent nodes. However, other networks can be envisaged. The nodes 305 are connected together using a fibre-optic cable, which provides a high bit rate point-to-point link. In this embodiment, one node at one end of a link will have a detector and the node of the other end of the link will have a photon source.

Two of the nodes 307, 309 provide a link to a quantum access network 303. These nodes will be termed quantum network units. The quantum network units 307, 309, each comprise a detector which is the detector 21 described with reference to FIGS. 2 to 5. The network also comprises a plurality of so-called quantum termination units 311. The quantum termination units each comprise a source which can send encoded photons to the QNU 307, 309.

The quantum termination units can be provided by the photon sources 23 of FIGS. 2 to 5.

In the system of FIG. 11, the Quantum Core Network 301 connects the secured nodes 305, 307, 309 of a service provider or an organisation in a mesh or a ring arrangement. Meanwhile Quantum Access Networks 303 will link these secure nodes to the customer/end-user premise. Such architectures have the advantage of allowing many users to be connected to the network in a cost effective manner.

Individual secret keys are formed between the central station of QNU 307, 309 and each of its connected end points or QTUs 311 using the QKD protocol described above. The protocol provides that each of the keys formed by each QTU 311 is unique and secret from the other QTUs 311. Similarly secret keys may be formed between any directly connected, adjacent nodes in the Quantum Core Network 301, by QKD. The keys formed between directly connected points in the QKD network are termed 'local' keys. A 'global' key may be distributed between any two end-points in the network, by using the local keys formed between adjacent nodes to perform one-time pad encryption of the global key. This may then be used to form a global key between two QTUs 311 connected to the same QNU 307, 309, or between two QTUs 311 connected to different QNUs 307, 309.

These keys can be used for subsequent cryptographic tasks such as the authentication and encryption of data sent between the corresponding endpoints containing the QTUs.

Once a key is established, it is used to encrypt and decrypt data to be sent over a classical channel. The classical channel may be provided in a separate optical fibre to the fibre used for quantum communication or the same fibre may be used, but the classical data sent at a different wavelength.

The near term applications for QKD are regarded to be in the networks of banks, insurance companies, government departments, large corporations, healthcare providers and utility companies. Much of the information sent through these communication networks will remain sensitive for many years, eg personal and health issues or sensitive company information. However, the cryptographic systems used today, which are based on computational complexity, will almost certainly be broken in the future, as history has shown on several occasions, thanks to the relentless increase in computing power. Furthermore, there is a concern that mathematical algorithms may be discovered, or quantum computers developed, which would render today's cryptographic techniques obsolete overnight. In contrast, the security of QKD is not vulnerable to future advances in computing, mathematics or engineering. With so much of our economy and society reliant on secure communications, there is a pressing need for future-proof security paradigm.

QKD can be applied to the general telecom network. One example of how quantum keys may be used in this scenario is to encrypt/authenticate data on a conventional Passive Optical Access Network. Data is typically encrypted for the intended recipient on a PON and then broadcast to all users. The Quantum Access Network described above would allow an AES256 encryption or authentication key to be refreshed every 1-2 millisecond, greatly reducing the risk of cryptanalysis.

Figure 13:
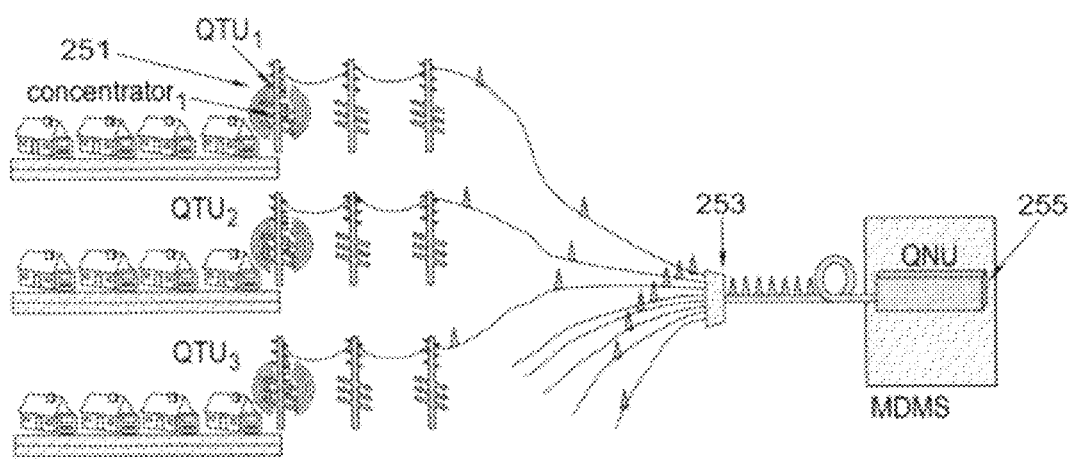
FIG. 13 is a schematic of a quantum communication system in accordance with an embodiment of the present invention applied to a smart grid network.

FIG. 13 shows a smart grid network realised using quantum key distribution. The network comprises a plurality of smart meters, each of which comprises a quantum termination unit 251. The QTUs 251 are connected via a coupler 253 to a quantum network unit 255. The quantum network unit 255 comprises a detector as previously described with reference to FIGS. 2 to 5. The QTUs are similar in construction to the emitters 23 of FIGS. 2 to 5.

As before, once a key is established, it is used to encrypt and decrypt data to be sent over a classical channel. The classical channel may be provided in a separate optical fibre to the fibre used for quantum communication or the same fibre may be used, but the classical data sent at a different wavelength.

The quantum single-to-multipoint network described above is used to make secure connections within the distribution part of the Smart Grid Network. Future energy supply systems will incorporate a Smart Meter at each consumer or business premise. This Smart Meter will collect a large volume of data about energy use and generation at the premise, which will be transmitted back to the control facilities of the utility company. Much of this information is personal and/or confidential in nature and must be secured. In a domestic context, it could include information about the usage of electrical appliances or electric vehicles. It could be used maliciously to gain information about, for example, the occupancy of buildings or processes on industrial sites.

Quantum key distribution may be used to ensure confidentiality (to ensure it is only intelligible to the intended recipient), authenticity (to ensure messages originate from the legitimate sender) and integrity (to ensure the messages are not maliciously altered) of data in the supply network. The single-to-multipoint networks described above may be used to form a secure connection from the Meter Data Management System of the Utility Company to the Smart Meter of the customer. Alternatively the single-to-multipoint network may be used to connect from the MDMS to the meter data concentrator point positioned in the street or elsewhere within the local community.

Figure 14:
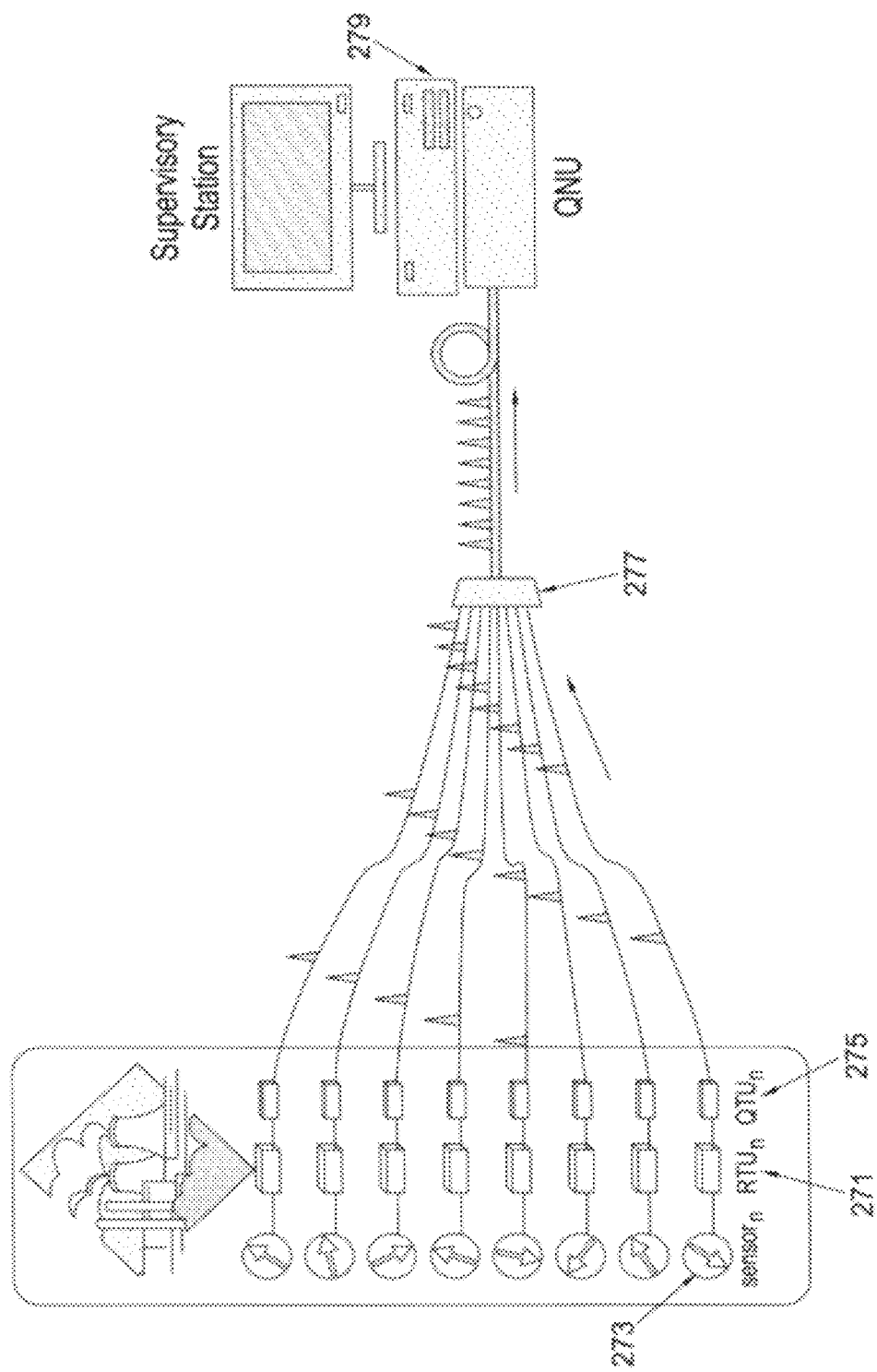
FIG. 14 is a schematic of a quantum communication system in accordance with an embodiment of the present invention applied to a SCADA network.

FIG. 14 is a schematic of the above described quantum communication system applied to a supervisory control and data acquisition network a so-called SCADA network or a Distributed Control Systems (DCS) that are often used to control and monitor industrial, infrastructure or facility-based processes. This quantum network comprises a plurality of remote terminal units 271. Each remote terminal unit is connected to physical equipment, in this particular example, it is a sensor 273. The remote terminal units collect data from the physical equipment 273 and convert it to digital form. Remote terminal units 271 are connected to a quantum termination unit 275. Quantum termination unit is the same as those described with reference to FIGS. 12 and 13. The quantum termination unit comprises a photon source which sends signals across the network. Signals are combined at combiner 277 and then directed into quantum network unit 279.

Once a key is established, it is used to encrypt and decrypt data to be sent over a classical channel. The classical channel may be provided in a separate optical fibre to the fibre used for quantum communication or the same fibre may be used, but the classical data sent at a different wavelength.

Industrial processes implementing SCADA networks include manufacturing plant, refineries, fabrication facilities and power generation facilities. Critical infrastructure relying on SCADA include electrical power transmission and distribution, wind farms, solar energy farms, water treatment plants, oil and gas pipelines. Public facilities monitored by SCADA include railways, airports, ships and buildings.

As critical infrastructure becomes increasingly connected, it is essential to protect the security of the information that is communicated. Quantum Key Distribution can be used to ensure that the data is confidential (unintelligible to everyone except intended users), authentic (originate from the legitimate sources) and retains integrity (has not been maliciously altered). Uniquely QKD also allows intrusion detection on the communication network.

In this application the single-to-multipoint network described above may be used to secure connections from the Supervisory Station to the Remote Terminal Units 271 which connect to the physical equipment 273. The RTUs collect data from the physical equipment 273, convert it to digital form and transmit this data to the Supervisory Station 279. They also implement instructions from the Supervisory Station on the equipment. Quantum Key Distribution may be used to authenticate and encrypt this information flow. Although FIG. 14 shows 8 sensors connected to the SCADA network, in reality the network will comprise elements both for sensing and control of the equipment.

While certain embodiments have been described, these embodiments have been presented by way of example only, and are not intended to limit the scope of the inventions. Indeed the novel methods and systems described herein may be embodied in a variety of other forms; furthermore, various omissions, substitutions and changes in the form of methods and systems described herein may be made without departing from the spirit of the inventions. The accompanying claims and their equivalents are intended to cover such forms of modifications as would fall within the scope and spirit of the inventions.

The invention claimed is:

1. A communication system comprising:
a receiver and a plurality of transmitters, said transmitters being configured to transmit information by encoded single quanta, said receiver comprising a detector subsystem, each of said transmitters being configured to emit light pulses of radiation, said detector subsystem comprising at least one detector, said detector being configured to detect said light pulses,
the receiver further comprising a timing control module, configured to provide a clock signal to synchronize a first control element at each transmitter with the receiver, the timing control module being further configured to control the number of light pulses received by the detector sub-system according to the clock signal, such that just one light pulse from one transmitter reaches the detector sub-system at any one time, wherein the clock signal provides a time reference for light pulse arrivals, allowing the transmitter which sent said light pulse to be identified,
said receiver further comprising a feedback control unit configured to generate a feedback signal for each transmitter, the receiver being configured to transmit the feedback signal to each transmitter, wherein the first or another control element at each transmitter is configured to be controlled by the feedback signal from said receiver to actively stabilize a physical parameter.

2. A communication system according to claim 1, wherein the timing control module is configured to allow only a single transmitter to emit a light pulse for each arrival time at the detector subsystem.

3. A communication system according to claim 1, wherein the plurality of transmitters are connected to said receiver through a signal combining device.

4. A communication system according to claim 3, wherein the timing control module is configured to control said signal combining device to only pass signals from a single transmitter to said receiver for each arrival time at the detector subsystem.

5. A communication system according to claim 3, wherein the receiver comprises a decoder and at least two of the transmitters each comprise an encoder.

6. A communication system according to claim 3, wherein the signal combining device is an N×1 passive optical coupler.

7. A communication system according to claim 3, wherein the signal combining device is a fast N×1 optical switch.

8. A communication system according to claim 3, wherein the signal combining device is a wavelength division multiplexing coupler.

9. A communication system according to claim 8, wherein the timing control module is provided in the receiver and a timing signal to control which transmitters should transmit pulses to said receiver is distributed from said receiver to said transmitters using said wavelength division multiplexer and a 1×N passive coupler.

10. A communication system according to claim 3, wherein the signal combining device is an optical mirror based N×1 active coupler.

11. A communication system according to claim 1, wherein the timing control module is provided in the receiver and a timing signal to control which transmitters should transmit pulses to said receiver is distributed from said receiver to said transmitters.

12. A communication system according to claim 1, wherein the detector subsystem comprises at least one gated detector and said timing control module is configured to synchronise the gating of the detector with the arrival time of light pulses from the transmitters.

13. A communication system according to claim 1, wherein the detector sub-system comprises a plurality of gated single photon detectors.

14. A communication system according to claim 1, wherein the detector sub-system comprise a plurality of free-running single photon detectors.

15. A communication system according to claim 1, wherein a transmitter of said plurality of transmitters is coupled to a unit which is capable of receiving encrypted data, said unit being configured to decrypt said encrypted data using a key established between the transmitter coupled to the unit and the detector subsystem.

16. A communication system according to claim 15, wherein said unit is capable of being controlled by a control signal, and said control signal is encrypted.

17. A communication system according to claim 1, wherein a transmitter of said plurality of transmitters is coupled to a unit which is capable of sending data, said unit being configured to encrypt said data using a key established between the transmitter coupled to the unit and the detector subsystem.

18. A communication system according to claim 1, wherein the said plurality of transmitters, detector subsystem and timing control module form a first network, the communication system further comprising a second network, said second network comprising a plurality of nodes, each node being connected to at least one other node to form a pair of connected nodes, wherein one node in each pair of connected nodes comprises a transmitter being configured to emit light pulses of radiation, wherein the other of said nodes comprises a detector subsystem, said detector subsystem comprising at least one detector, said detector being configured to detect said light pulses, at least one of said nodes of said second network comprising a detector subsystem of said first network such that information can be transferred between said first and second networks via said node.

19. A communication system according to claim 1, wherein each transmitter comprises a light source and the first control element is control electronics that drives the light source.

20. A communication method for communicating over a network comprising a receiver and a plurality of transmitters, said transmitters being configured to transmit information by encoded signal quanta, each of said transmitters being configured to emit light pulses of radiation, wherein said receiver comprises a timing control module and a detector sub-system, said detector subsystem comprising at least one detector, said detector being configured to detect said light pulses, the method comprising:
- providing a clock signal at the timing control module to synchronize a first control element at each transmitter with the receiver;
- emitting pulses of radiation from said plurality of transmitters;
- combining the output of the plurality of transmitters into a single channel;
- controlling the light pulses that enter said single channel according to the clock signal, such that only one light pulse from one transmitter enters the channel at a time, wherein the clock signal provides a time reference for light pulse arrivals;
- receiving the light pulses at the detector subsystem, the transmitter for each light pulse being identified by the timing when the light pulse was received at the detector;
- generating a feedback signal for each transmitter at a feedback control unit at the receiver; and
- transmitting the feedback signal to each transmitter, the first or another control element at each transmitter is configured to be controlled by the feedback signal from said receiver to actively stabilize a physical parameter.

21. A receiver, comprising:
- a detector sub-system, said detector subsystem comprising at least one detector, the detector being configured to detect light pulses emitted from a plurality of transmitters, said transmitters being configured to transmit information by encoded signal quanta,
- a timing control module, configured to provide a clock signal to synchronize a first control element at each transmitter with the receiver and configured to control the number of light pulses received by the detector subsystem according to the clock signal, such that just one light pulse from one transmitter reaches the detector sub-system at any one time, wherein the clock signal provides a time reference for light pulse arrivals, allowing the transmitter which sent the light pulse to be identified; and
- a feedback control unit configured to generate a feedback signal for each transmitter, the receiver being configured to transmit the feedback signal to each transmitter such that the feedback signal controls the first or another control element in each transmitter to actively stabilize a physical parameter.

22. A transmitter, being configured to transmit information by encoded single quanta, the transmitter comprising:
- control electronics, configured to receive a clock signal and a feedback signal from a receiver;
- a light source, wherein the light source is driven by the clock signal such that just one light pulse reaches the receiver detector sub-system at any one time, wherein the clock signal provides a time reference for light pulse arrivals such that the transmitter can be identified, and such that the light source is synchronized with the receiver; and
- a control element, configured to be controlled by the feedback signal to actively stabilize a physical parameter.

* * * * *